US009178409B2

United States Patent
Sakakibara

(10) Patent No.: US 9,178,409 B2
(45) Date of Patent: Nov. 3, 2015

(54) POWER CONVERSION CONTROL DEVICE THAT CONTROLS COMMUTATION OF POWER CONVERTING APPARATUS BASED ON DEAD TIME

(71) Applicant: DAIKIN INDUSTRIES, LTD., Osaka-shi, Osaka (JP)

(72) Inventor: Kenichi Sakakibara, Kusatsu (JP)

(73) Assignee: Daikin Industries, Ltd., Osaka-Shi (JP)

( * ) Notice: Subject to any disclaimer, the term of this patent is extended or adjusted under 35 U.S.C. 154(b) by 0 days.

(21) Appl. No.: 14/360,842

(22) PCT Filed: Nov. 27, 2012

(86) PCT No.: PCT/JP2012/080549
§ 371 (c)(1),
(2) Date: Jul. 28, 2014

(87) PCT Pub. No.: WO2013/080942
PCT Pub. Date: Jun. 6, 2013

(65) Prior Publication Data
US 2014/0369089 A1 Dec. 18, 2014

(30) Foreign Application Priority Data

Nov. 28, 2011 (JP) .................................. 2011-258985

(51) Int. Cl.
*H02M 5/458* (2006.01)
*H02M 1/08* (2006.01)
*H02M 7/5395* (2006.01)
H02J 3/36 (2006.01)
H02M 1/38 (2007.01)

(52) U.S. Cl.
CPC ............... *H02M 1/08* (2013.01); *H02M 5/458* (2013.01); *H02M 5/4585* (2013.01); *H02M 7/5395* (2013.01); H02M 2001/385 (2013.01)

(58) Field of Classification Search
CPC ........ H02M 5/4585; H02M 5/458; H02J 3/36
USPC ..................................................... 363/34–37
See application file for complete search history.

(56) References Cited

U.S. PATENT DOCUMENTS

| 7,944,717 B2 | 5/2011 | Sakakibara | |
|---|---|---|---|
| 2010/0308892 A1 | 12/2010 | Sakakibara | |
| 2012/0075892 A1* | 3/2012 | Tallam et al. | 363/37 |
| 2012/0201056 A1* | 8/2012 | Wei et al. | 363/37 |

FOREIGN PATENT DOCUMENTS

| JP | 4135026 B2 | 8/2008 |
|---|---|---|
| JP | 2009-213252 A | 9/2009 |
| JP | 2011-193678 A | 9/2011 |
| JP | 5045716 B2 | 10/2012 |

OTHER PUBLICATIONS

Ohnuma et al., "Basic Investigation and Capacitance Reduction method of A Novel Single-Phase to Three-Phase Power Converter", Papers of Technical Meeting on Semiconductor Power Converter, IEE Japan, SPC-08-162, (2008), pp. 7-12.

Wei et al., "A Novel Matrix Converter Topology With Simple Commutation", Department of Electrical and Computer Engineering, University of Wisconsin-Madison, IEEE ISA2001, vol. 3, pp. 1-6, 2001.

* cited by examiner

*Primary Examiner* — Gary L Laxton
*Assistant Examiner* — Peter Novak
(74) *Attorney, Agent, or Firm* — Birch, Stewart, Kolasch & Birch, LLP

(57) ABSTRACT

A period composed of a total of three periods, namely a period when an actual voltage vector is employed and periods before and after it can be regarded as an isolation period when an actual voltage vector is isolated in a vicinity where switching for commutation in a current-source converter is generated. When the switching in the current-source converter occurs at the isolation period, zero-current switching is realized. When presence of dead time is thus taken into consideration, a width of the timing when the zero-current switching is realized is made to be broader than a case where the presence of the dead time is not taken into consideration by the dead time.

15 Claims, 19 Drawing Sheets

F I G. 8
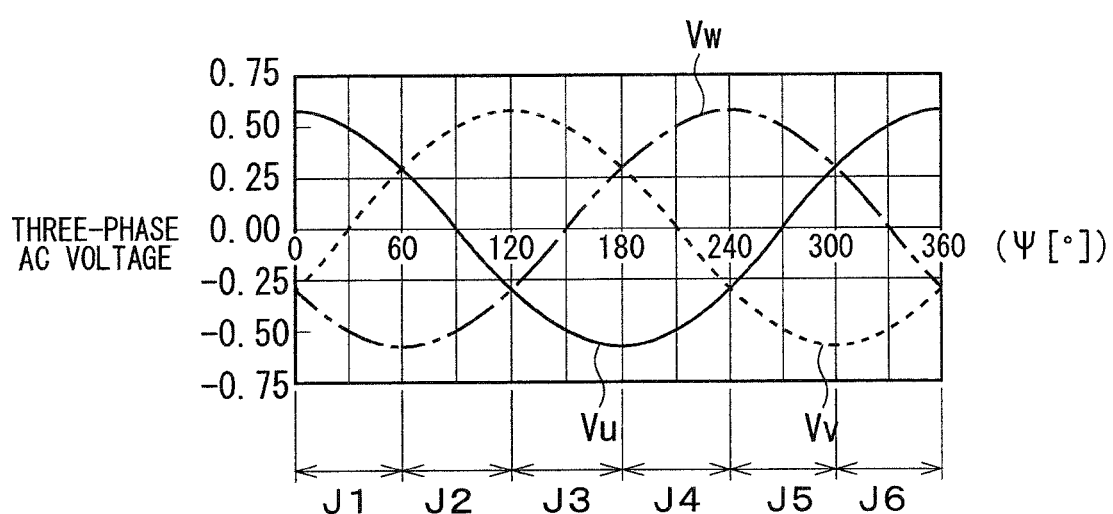

F I G . 1 1
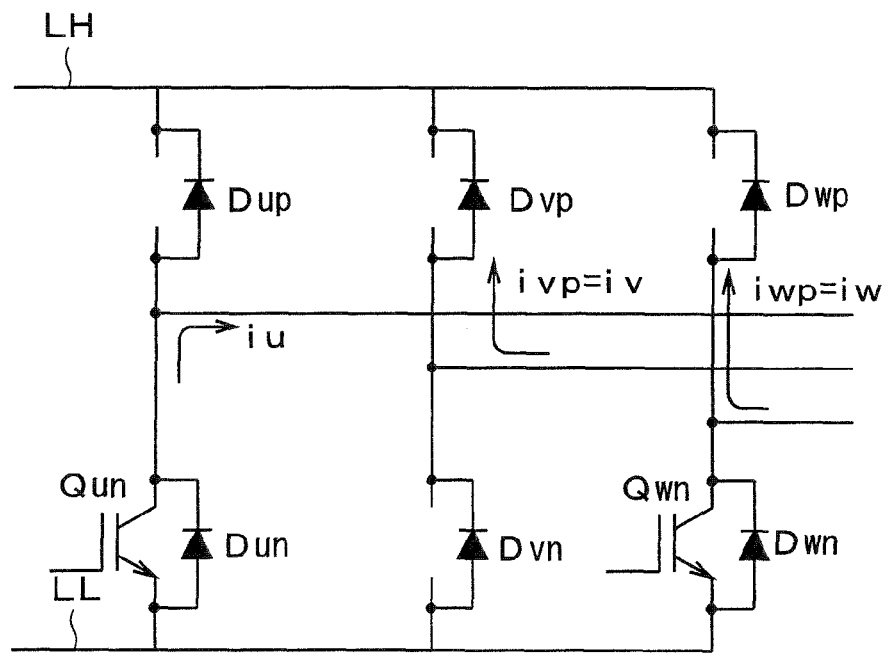
F I G . 1 2
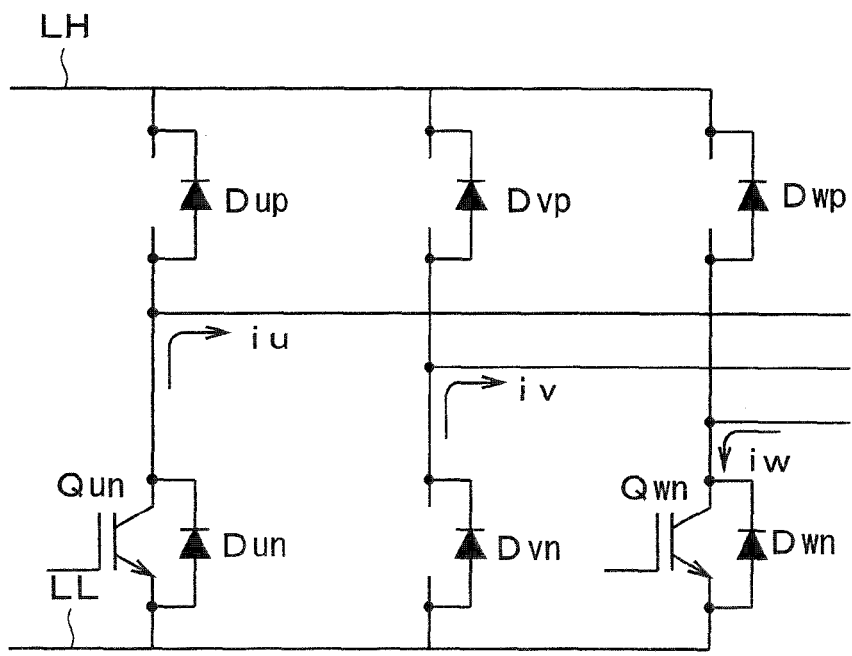

F I G. 1 5
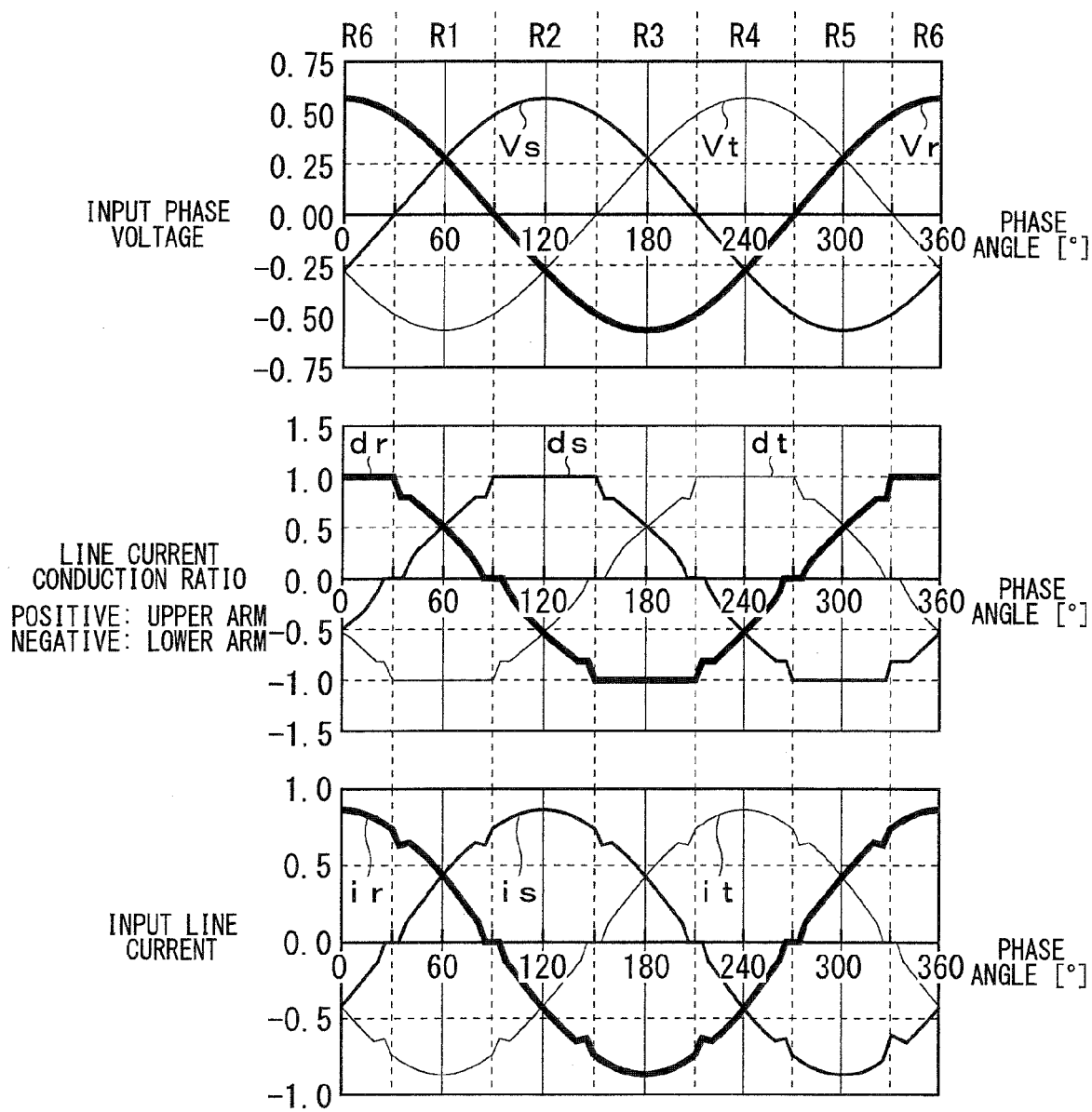

POWER CONVERSION CONTROL DEVICE THAT CONTROLS COMMUTATION OF POWER CONVERTING APPARATUS BASED ON DEAD TIME

TECHNICAL FIELD

The present invention relates to a power converting apparatus, and more particularly, to a technique for improving a modulation factor of a voltage-source inverter.

BACKGROUND ART

For example, an inverter has three current paths, and outputs a three-phase AC voltage to a three-phase load. Each of the current paths has a pair of switch devices on a high-potential side and a low-potential side of a DC voltage, respectively. Each of the switch devices carries out switching based on a switching pattern decided based on a result of comparing a carrier value with a signal wave value. The three-phase AC voltage is output based on this switching.

An example of a power converting apparatus includes an indirect matrix converter having a current-source converter, a voltage-source inverter, and a DC link for connecting the converter and the inverter. In the indirect matrix converter, the DC voltage is applied to the DC link, but the DC link does not have a smoothing circuit.

The current-source converter generates so-called commutation for switching the current paths through switching, and converts an alternating current into the DC voltage. In order to reduce loss at the time of switching by the current-source converter, so-called zero-current switching for applying no currents to the current-source converter at the time of switching is proposed.

In order to prevent a current from being applied to the current-source converter, the DC link is insulated from the three-phase load in the voltage-source inverter. Particularly in a case where the three-phase load is an electric motor, the three-phase load is short-circuited in order to return a current caused by a counter-electromotive force of the electric motor. Such an operation of the voltage-source inverter is realized by employing a switching pattern based on a voltage vector generally called a zero voltage vector.

SUMMARY OF INVENTION

Problems to be Solved by the Invention

As described above, when a zero voltage vector is employed in control of a voltage-source inverter in order to realize zero-current switching in a current-source converter, a period for which a line voltage is supplied to the three-phase load is practically reduced. Therefore, a level of a line voltage to be output from the inverter with respect to a DC voltage to be output from the current-source converter (this is also a DC voltage to be input into the voltage-source inverter in the indirect matrix converter), namely, a so-called modulation factor reduces.

The similar problem might arises also in a case where a converter is constituted by a passive element such as a diode bridge. For example, a non-linear capacitor circuit disclosed in Japanese Patent No. 5045716 receives a voltage output from a diode rectifier and reduces a voltage to be applied to the inverter. Further, a charge and discharge circuit disclosed in Japanese Patent Application Laid-Open No. 2011-193678 receives a voltage output from the diode rectifier and increases a voltage to be applied to the inverter.

Since a commutation operation is performed inside the non-linear capacitor circuit and the charge and discharge circuit, similarly to the commutation of the current-source converter, the zero-current switching is desired. However, when the zero voltage vector is employed in the control of the voltage-source inverter in order to realize the zero-current switching, a voltage control factor reduces. The voltage control factor herein, refers to the level of a line voltage to be output from the inverter with respect to a DC voltage to be output from the diode bridge. Since the voltage control factor is a ratio based on a voltage to be output from the diode bridge and a voltage to be output from the inverter, the voltage control factor is treated similarly to the modulation factor in this application for convenience.

It is, therefore, an object of the present invention to provide a technique which improves a modulation factor in a voltage source inverter, realizing zero-current switching at a previous stage of an inverter, such as a current-source converter, the non-linear capacitor circuit described in Japanese Patent No. 5045716, and the charge and discharge circuit described in Japanese Patent Application Laid-Open No. 2011-193678.

Means for Solving Problems

In order to solve the above problem, a power conversion control device (9, 10) of the present invention includes a carrier generating unit (35), a rectifying unit controller (20; 10), and an inverter controller (30). Herein, a subject to be controlled by the power conversion control device is a power converting apparatus and the power converting apparatus includes: a plurality of input terminals (Pr, Ps, Pt; 31, 32); first to third output terminals (Pu, Pv, Pw); first and second DC buses (LH, LL); a rectifying unit (2; 2B; 2C); and a voltage-source inverter (5).

Alternating voltages (Vr, Vs, Vt; Vi) are applied to the plurality of input terminals, respectively.

The rectifying unit rectifies the alternating voltage with commutation through switching, makes the first DC bus (LH) have a higher potential than the second DC bus (LL) and applies a DC current (Idc) from the first DC bus (LH) to the second DC bus (LL).

The voltage-source inverter converts a DC voltage (Vdc) between the first DC bus (LH) and the second DC bus (LL) into three-phase voltages (Vu, Vv, Vw) so as to output them to the first to third output terminals.

The voltage-source inverter includes three current paths that are connected to each other in parallel between the first and second DC buses (LH, LL) to which the DC voltage is applied.

The current paths are connected between the first DC bus and the first to third output terminals, respectively.

Each of the current paths has upper arm side switches (Qup, Qvp, Qwp), lower arm side switches (Qun, Qvn, Qwn), upper arm side diodes (Dup, Dvp, Dwp), and lower arm side diodes (Dun, Dvn, Dwn).

The upper arm side switches are connected between the first to third output terminals and the first DC bus, respectively, and apply currents from the first DC bus to the first to third output terminals, respectively during conduction. The lower arm side switches are connected between the first to third output terminals and the second DC bus, respectively, and applies currents from the first to third output terminals to the second DC bus, respectively, during conduction.

The upper arm side diodes are connected to the upper arm side switches in anti-parallel, respectively. The lower arm side diodes are connected to the lower arm side switches in anti-parallel, respectively.

The carrier generating unit generates a carrier (C2) presenting a triangular wave in which an absolute value (tan α) of a slope with respect to time is constant and which reciprocates between a minimum value (0) and a maximum value (1).

A first aspect of a power conversion control device according to the present invention has the following characteristics. The rectifying unit controller makes the rectifying unit perform the commutation at a time point obtained by adding predetermined time (tc) to a commutation reference time point (t00) when the carrier takes a commutation reference value (dirt; 1-dc) no less than the minimum value and no more than the maximum value.

The inverter controller controls an on/off of the upper arm side switches and the lower arm side switches of the voltage-source inverter based on a comparison between the carrier and the signal waves of the three-phase voltages.

The inverter controller brings all the upper arm side switches into the off state in an isolation period (Ud, V0) where a first time point (t01, t03) is a commencement and a time point obtained by adding dead time (td) to a second time point (t02, t04) is a termination.

Herein, the first time point (t01; t03) is a time point when the carrier obtains a value of a first signal wave (Vu1*; Vu2*) of the signal waves, and the second time point (t02, t04) is a time point when the carrier obtains a value of a second signal wave (Vu2*; Vu1*) of the signal waves for the first time after the first time point. Further, the first signal wave and the second signal wave are the signal waves for the maximum phase of the three-phase voltages.

The upper arm side switch (Qup) for applying a current corresponding to a voltage of maximum phase shifts from the on state to the off state at the first time point, and shifts from the off state to the on state after the dead time passes since the second time point.

The predetermined time (tc) is set to a value that is larger than a value (−τ01) obtained by subtracting the commutation reference time point from the first time point and is shorter than a sum of a value (τ02) obtained by subtracting the commutation reference time point from the second time point and the dead time.

A second aspect of the power control device according to the present invention is the first aspect thereof, in which the plurality of input terminals are three input terminals (Pr, Ps, Pt). The rectifying unit is a current-source converter (2), and has a switch group including three switch devices (Srp, Ssp, Stp) connected between the first to third input terminals and the first DC power supply line, respectively, and three switch devices (Sm, Ssn, Stn) connected between the first to third input terminals and the second DC power supply line, respectively. The rectifying unit commutates and outputs three-phase currents (ir, is, it) to be input into the first to third input terminals by switching of the switch group.

A third aspect of the power control device according to the present invention is the first aspect thereof, in which the plurality of input terminals are a pair of input terminals (31, 32). The rectifying unit (2B; 2C) has a diode bridge (3) connected to the pair of input terminals, and a buffer unit (4; 4a) including charge and discharge element (C41, C42; C4) and switch devices (S41, S42; Sc) for controlling discharge from the charge and discharge element to the first and second DC buses (LH, LL). The rectifying unit commutates and outputs current to be input into the pair of input terminals, and discharge current of the charge and discharge element by switching of the switch devices.

A fourth aspect of the power control device according to the present invention is any one of the first to third aspects thereof, in which the predetermined time (tc) is sets to a half ((½)(τ02−τ01+td))) of a sum of a value (−τ01) obtained by subtracting the commutation reference time point from the first time point, a value (τ02) obtained by subtracting the commutation reference time point (t00) from the second time point (t02), and the dead time (td).

A fifth aspect of the power control device according to the present invention is any one of the first to fourth aspects thereof, in which a value (d0) obtained by subtracting the first signal wave from the second signal wave is larger than a value (−td·tan α) obtained by subtracting a product of an absolute value (tan α) of the slope of the carrier and the dead time (td) from zero.

A sixth aspect of the power control device according to the present invention is any one of the first to third aspects thereof, in which the predetermined time (tc) is set to a half (td/2) of the dead time.

Effects of the Invention

According to the first to third aspects of the power control device of the present invention, the rectifying unit performs the commutation at a zero voltage vector period eroded by the dead time and at the period of the dead time. Similarly to the zero voltage vector period, since a current does not flow in the rectifying unit also at the period of the dead time, a loss at time when the rectifying unit performs the commutation can be reduced.

According to the fourth aspect of the power control device of the present invention, since timing at which the rectifying unit performs the commutation is at the center of the isolation period, even if the length of the zero voltage vector is shortened, the effect of the first aspect can be obtained and a modulation factor can be heightened.

According to the fifth aspect of the power control device of the present invention, the isolation period generated due to the dead time can be secured.

According to the sixth aspect of the power control device of the present invention, even when the zero voltage vector period is not practically provided, and regardless of sizes of the first signal wave and the second signal wave, since the rectifying unit performs the commutation during the dead time, so-called zero-current switching is enabled.

Objects, features, aspects and advantages of the present invention will be apparent from the following detailed description taken in conjunction with the accompanying drawings.

BRIEF DESCRIPTION OF DRAWINGS

FIG. 8 is a graph illustrating waveforms of three-phase voltages;

FIG. 11 is a circuit diagram illustrating the equivalent circuit of the voltage-source inverter at the isolation period;

FIG. 12 is a circuit diagram illustrating the equivalent circuit of the voltage-source inverter at the isolation period;

FIG. 15 is a graph describing an operation of a current-source converter;

DESCRIPTION OF EMBODIMENTS

First Embodiment

{Basic Operation}

Figure 1:
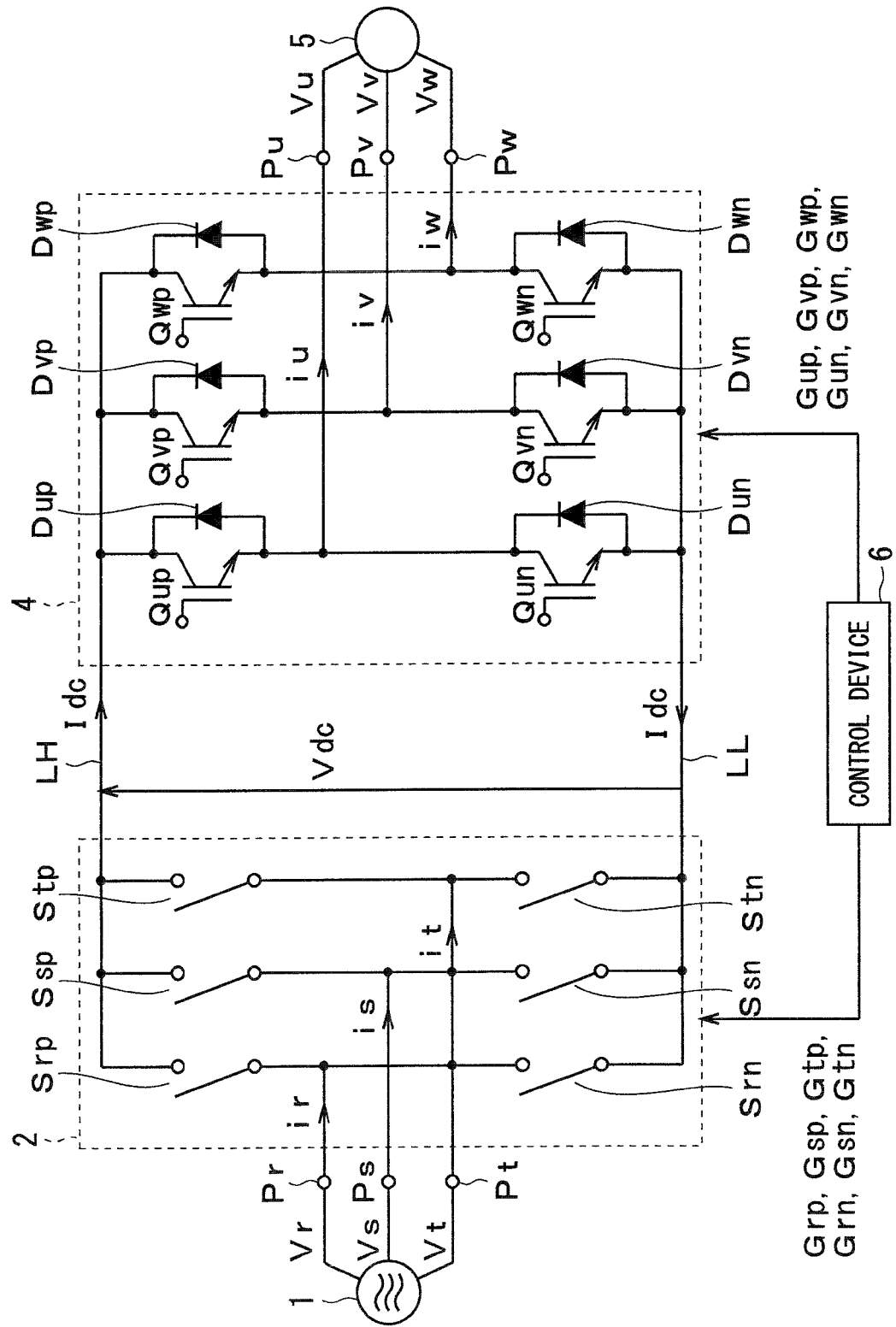
FIG. 1 is a circuit diagram illustrating a constitution of a power converting apparatus which employs a first embodiment of the present invention.

FIG. 1 is a circuit diagram illustrating a constitution of a power converting apparatus which employs the embodiment of the present invention. A direct AC power converting apparatus illustrated here is an indirect matrix converter, and includes a current-source converter 2 for performing AC/DC conversion, and a voltage-source inverter 5 for performing DC/AC conversion. The current-source converter 2 and the voltage-source inverter 5 are connected by DC buses LH and LL. The DC bus LH has a higher potential than that of the DC bus LL.

The voltage-source inverter 5 includes three current paths that are connected to each other in parallel between the DC buses LH and LL that receive a link voltage Vdc as a DC voltage.

The first current path has a connection point Pu, an upper arm side switch Qup, and a lower arm side switch Qun. The second current path has a connection point Pv, an upper arm side switch Qvp, and a lower arm side switch Qvn. The third current path has a connection point Pw, an upper arm side switch Qwp, and a lower arm side switch Qwn.

The upper arm side switches Qup, Qvp, and Qwp apply currents from the DC bus LH to the connection points Pu, Pv, and Pw, respectively, during conduction. The lower arm side switches Qun, Qvn, and Qwn apply currents from the connection points Pu, Pv, and Pw to the DC bus LL, respectively, during conduction.

The voltage-source inverter 5 performs switching on the link voltage Vdc in a switching pattern based on pulse width modulation, and outputs the three-phase voltages Vu, Vv, and Vw from the connection points Pu, Pv, and Pw to a three-phase load 6, respectively. The connection points Pu, Pv, and Pw can be regarded as output terminals for outputting line currents iu, iv, and iw to the three-phase load 6. The following describes the line currents iu, iv, and iw in a case where a direction from the output terminals Pu, Pv, and Pw toward the three-phase load 6 is a positive direction.

The upper arm side diodes Dup, Dvp, and Dwp are connected to the upper arm side switches Qup, Qvp, and Qwp in anti-parallel, respectively. Lower arm side diodes Dun, Dvn, and Dwn are connected to the lower arm side switches Qun, Qvn, and Qwn in anti-parallel, respectively. Here, "Anti-parallel" means a mode where two elements are connected in parallel and conductive directions of the two elements are opposite to each other.

The current-source converter 2 has three input terminals Pr, Ps, and Pt. The input terminals Pr, Ps, and Pt are connected to, for example, a three-phase AC power supply 1, and receives the three-phase voltages Vr, Vs, and Vt according to respective phases. The current-source converter 2 commutates the three-phase line currents ir, is, and it supplied from the input terminals Pr, Ps, and Pt in a cycle divided into a first period and a second period, and applies a DC link current Idc between the DC buses LH and LL. The following describes the line currents ir, is, and it in a case where a direction from the input terminals Pr, Ps, and Pt toward the voltage-source inverter 5 is a positive direction.

The first period is a period when currents flowing in any one pair of the input terminals Pr, Ps, and Pt to which a phase voltage of a maximum phase and a phase voltage of a minimum phase are applied are supplied as the link current Idc between the DC buses LH and LL. Further, the second period is a period when currents flowing in any one pair of the input terminals Pr, Ps, and Pt to which a phase voltage of an intermediate phase and a phase voltage of a minimum phase are applied are supplied as the link current Idc between the DC buses LH and LL.

The current-source converter 2 has switch devices Sxp and Sxn (where, symbol x represents r, s, and t. The same applies hereinafter). The switch device Sxp is provided between an input terminal Px and the DC bus LH. The switch device Sxn is provided between the input terminal Px and the DC bus LL.

The switch devices Sxp and Sxn can be realized by series connection between an insulating gate bipolar transistor (IGBT) and a diode or a RB-IGBT (Reverse Blocking IGBT).

The switch devices Sxp and Sxn receive switching signals Gxp and Gxn respectively. The switch device Sxp is conductive/non-conductive according to an activation/inactivation of the switching signal Gxp, and the switch device Sxn is conductive/non-conductive according to an activation/inactivation of the switching signal Gxn.

Switches Qyp and Qyn receive switching signals Gyp and Gyn, respectively (where, symbol y represents u, v, and w. The same applies hereafter). The switch Qyp is conductive/nonconductive according to an activation/inactivation of the switching signal Gyp, and the switch Qyn is conductive/non-conductive according to an activation/inactivation of the switching signal Gyn.

Figure 2:
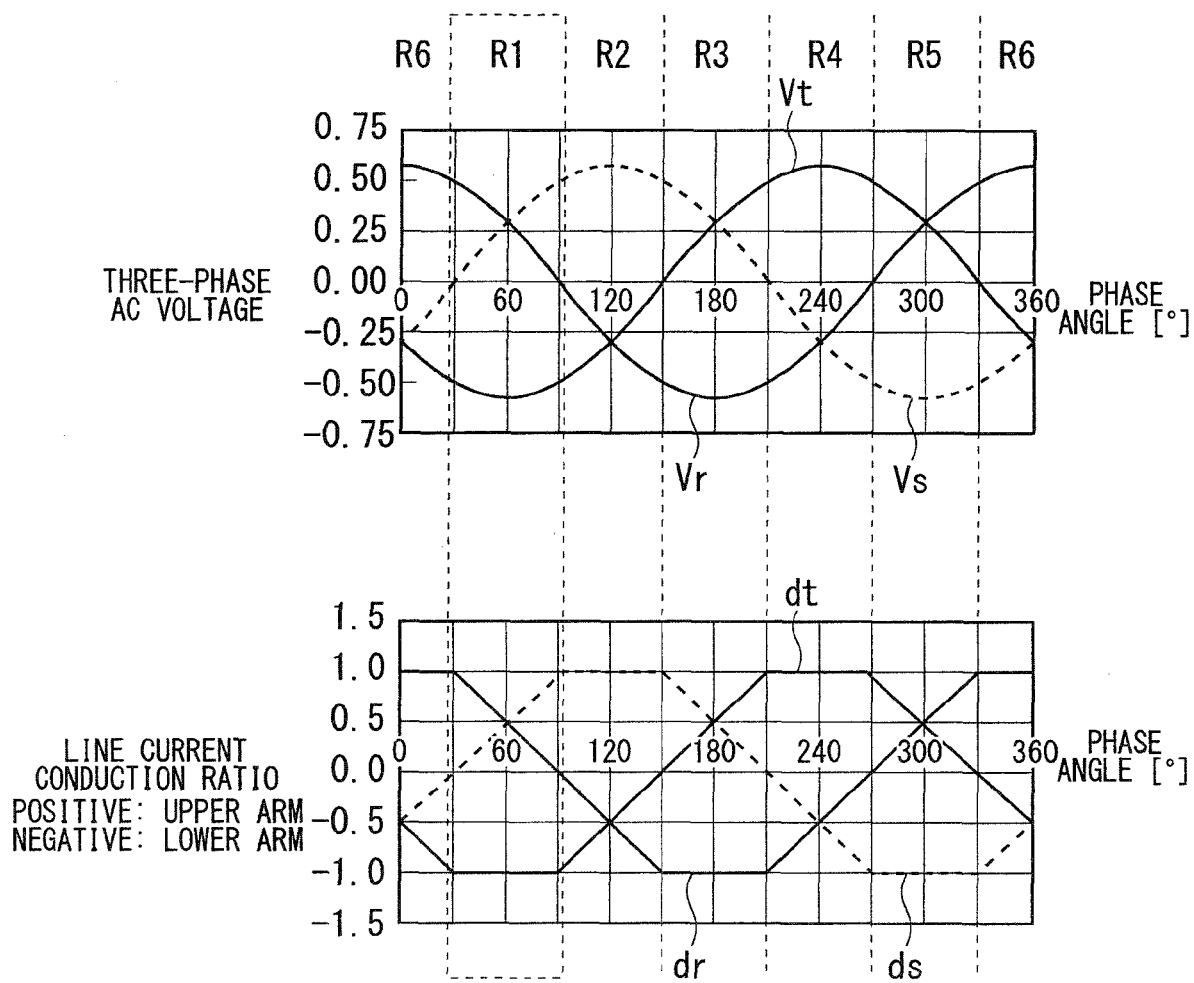
FIG. 2 is a graph describing an operation in a current-source converter.

FIG. 2 is a graph describing an operation in the current-source converter 2. The upper-stage graph shows the three-phase voltages Vr, Vs, and Vt, and the lower-stage graph shows current conduction ratios dr, ds, and dt.

Above the upper-stage graph in FIG. 2, time areas R1 to R6 are added. The areas R1 to R6 are time-divided from each other at timings when any one of the three-phase voltages Vr, Vs, and Vt whose absolute value is the largest is switched. The switching timings are also timings when any one of the three-phase voltages Vr, Vs, and Vt takes zero. Since the areas R1 to R6 are thus delimited, each of the areas has a length of π/3 obtained by dividing one cycle of the three-phase voltages Vr, Vs, and Vt by six. For example, the area R1 is an area where the absolute value of a phase voltage Vt is larger than the absolute values of the phase voltages Vr and Vs, and its commencement is a time point when the phase voltage Vs changes from negative to positive and its termination is a time point when the phase voltage Vr changes from positive to negative.

The three-phase voltages Vr, Vs, and Vt are expressed by a ratio to the maximum value of the line voltage, and thus the maximum value of the absolute values of the three-phase voltages Vr, Vs, and Vt is 1/√3. Herein, as a reference of phase angle) (0°) of the three-phase voltages, the time point when the three-phase voltages Vr takes the maximum value is employed.

A current conduction ratio dx represents a time ratio when the line current ix flows through switching of the switch devices Sxp and Sxn. When the current conduction ratio dx is positive, it indicates a time ratio at time when the switch device Sxp is conductive and a current flows toward the input terminal Px in the current-source converter 2, and when it is negative, it indicates a time ratio at time when the switch device Sxn is conductive and a current flows in the three-phase AC power supply 1 from the input terminal Px. Concretely, for example, in the area Rl, since the phase voltage Vt is the smallest, the switch device Stn is continuously conductive, and that is expressed as dt=−1. In this case, switch devices Srp and Ssp are alternately conductive, and the time ratios of their respective conduction are represented by current conduction ratios dr and ds. The switch devices Srp and Ssp are alternately conductive in a cycle shorter than one cycle of the three-phase voltages Vr, Vs, and Vt, so as to perform pulse width modulation.

As is understood from FIG. 2, when the phase voltage Vr is larger than the phase voltage Vs in the area R1, the current conduction ratio dr is larger than the current conduction ratio ds, and when the phase voltage Vr is smaller than the phase voltage Vs, the current conduction ratio dr is smaller than the current conduction ratio ds. It is desirable for bringing the line current ix close to a sine wave that the current conduction ratio of the line current corresponding to the phase voltage of the maximum phase is set larger than the current conduction ratio of the line current of intermediate phase. Since a technique for determining the current conduction ratio dx so that the line current ix is brought close to the sine wave is well known (for example, L. wei, T. A. Lipo, "A Novel Matrix converter Topology with Simple Commutation", IEEE ISA2001, vol 3, pp 1749-1754, 2001, Japanese Patent No. 4135026 and Japanese Patent Application Laid-Open No. 2009-213252), the concrete contents of this technique are omitted here.

Hereinafter, the description will be made taken the area R1 as an example. In the area R1, since the current conduction ratio dt is fixed to a value −1, the current conduction ratios dr and ds in the area R1 are described as the current conduction ratios drt and dst, respectively. The following description is obviously applicable also to the other areas R2 to R6 due to the symmetry of phase voltage waveforms by replacement of a phase order and mutual replacement of the switch devices Sxp and Sxn.

Figure 3:
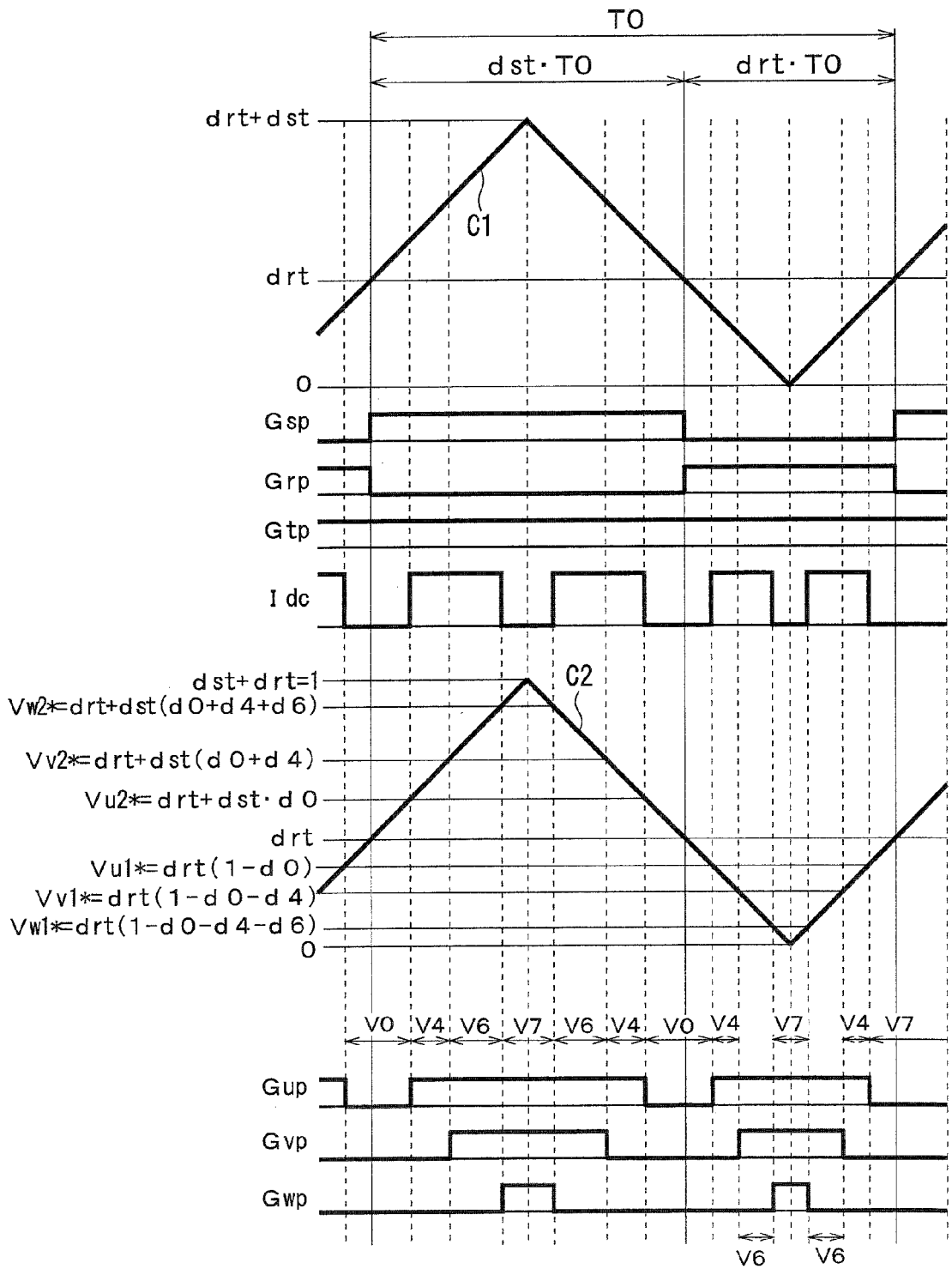
FIG. 3 is a graph describing an operation of the power converting apparatus in a conventional technique.

FIG. 3 is a graph describing an operation of the power converting apparatus in the conventional technique. In order to switch the current-source converter 2 according to the current conduction ratios drt and dst, a carrier C1 presenting a triangular wave that shifts between minimum value 0 and maximum value 1 is adopted herein. Since dst+drt=1, a time point when the carrier C1 is equal to the current conduction ratio drt can be employed as timing when the current-source converter 2 performs commutation.

When one cycle T0 of the carrier C1 is introduced, since the wave of the carrier C1 is a triangular wave, a length of the period while the carrier C1 is between value 0 and the current conduction ratio drt is expressed by drt·T0 (hereinafter, this period is called also "period drt·T0"). Further, a length of the period while the carrier C1 is between the current conduction ratio drt and value 1 is expressed by dst·T0 (hereinafter, the period is called also "period dst·T0"). The following drawings illustrate a case where dst>drt, namely, a case of a latter half of the area R1 where a phase angle is larger (the phase angle in FIG. 2 is 60 to 90°). In this case, the phase voltages Vr, Vs, and Vt have an intermediate phase, a maximum phase, and a minimum phase, respectively. The periods dst·T0 and drt·T0 can be regarded as the above-described first period and second period, respectively.

In the period dst·T0, the current flowing in a pair of the input terminals Ps and Pt among the input terminals Pr, Ps, and Pt of the current-source converter 2, to which the phase voltage Vs of the maximum phase and the phase voltage Vt of the minimum phase are applied, is supplied to the DC bus LH.

In the period drt·T0, the current flowing in a pair of the input terminals Pr and Pt among the input terminals Pr, Ps, and Pt, to which the phase voltage Vr of the intermediate phase and the phase voltage Vt of the minimum phase are applied, is supplied to the DC bus LH. Since the generation of the switching signals Gxp and Gxn that realizes the commutation is publicly known in, for example, Japanese Patent No. 4135026, the description thereof is omitted.

In order to modulate a instantaneous space voltage vector of the voltage-source inverter 5, a carrier C2 and a signal wave are compared and switching signals Gyp and Gyn are generated based on the compared result. In a conventional technique, a waveform whose shape and phase are the same as those of the carrier C1 is employed as the carrier C2. For the sake of simplifying the description, as an example, the minimum value is 0 and the maximum value is 1 as to all the carriers. However, the signal wave is suitably linearly converted so that any value can be selected for the minimum value and the maximum value.

The voltage vector to be employed by the voltage-source inverter 5 is supposed to be expressed by d4·V4+d6·V6 (d4+d6≤1) using vector calculation. Here, "unit voltage vector Vg" is introduced. In this description, values 4, 2 and 1 are allocated to a U phase, a V phase, and a W phase, respectively, and when the corresponding upper arms are conductive, value g takes a value obtained by summing up the allocated values that is an integer from 0 to 7.

For example, the unit voltage vector V4 expresses a switching pattern when switches Qup, Qvn, and Qwn are conductive, and the switches Qun, Qvp, and Qwp are non-conductive. Further, the unit voltage vector V6 expresses switching pattern when the switches Qup, Qvp, and Qwn are conductive, and the switches Qun, Qvn, and Qwp are non-conductive.

FIG. 3 illustrates the carrier C2 for one cycle in a case where the voltage vector expressing the switching pattern to be employed by the voltage-source inverter 5 is expressed by d4·V4+d6·V6 using the vector calculation, and relationships such that d0+d7=1−(d4+d6)>0, d0>0, and d7>0 hold. In such a case, the phase voltage Vw of the W phase is smaller than both the phase voltage Vu of the U phase and the phase voltage Vv of the V phase. Naturally, in another cycle of the carrier C2, the phase voltage Vu of the U phase or the phase voltage Vv of the V phase is occasionally smaller than other phase voltages, but the description is obviously applied to these cases by suitably switching and replacing the phase.

In such a case, the unit voltage vectors V0, V4, V6, and V7 are employed in a length of ratio d0:d4:d6:(1−d0−d4−d6). In this case, switching is performed in the case where the unit voltage vectors V0, V4, V6, and V7 are employed in the ratio d0:d4:d6:(1−d0−d4−d6) within one cycle T0 of the carrier C2.

The ratio of the length of each unit voltage vector to be employed to the carrier one cycle is also called a time ratio. Here, d0+d4+d6+d7=1.

When the unit voltage vectors V0 and V7 are employed, no current flows in the voltage-source inverter 5, and thus the link current Idc becomes zero.

Therefore, when switching of the current-source converter 2 is conducted in a period when switching patterns corresponding to the unit voltage vectors V0 and V7 are employed, so-called zero-current switching for applying no currents to the switch devices when the switching is realized. The zero-current switching is desirable from a viewpoint that loss of the current-source converter 2 is reduced.

How to set the periods when the unit voltage vectors V0, V4, V6 and V7 are employed as the switching patterns in the voltage-source inverter 5 based on the above viewpoint is publicly known (for example, Japanese Patent No. 5045716). Therefore, the concrete contents of this technique are omitted.

However, dead time is not conventionally taken into consideration in the zero-current switching. The dead time herein means the period for which the switches Qyn and Qyp are simultaneously non-conductive and it is provided in order to avoid a simultaneous conductive state of the switches Qyn and Qyp. In an examination for performing the zero-current switching, conventionally, the switching signal Gyn and the switching signal Gyp are treated as being activated in a complementary manner. Herein, the activation/inactivation of the switching signals Gyp and Gyn are expressed hereinafter as "H"/"L", and the switches Qyp and Qyn are made to be conductive/non-conductive, respectively.

As a specific exemplary case, FIG. 3 illustrates the following case. That is, when the carrier C2 takes a signal wave of the U phase Vu1*=drt(1−d0) or less, or a signal wave of the U phase Vu2*=(drt+dst·d0) or more, a switching signal Gup is activated. When the carrier C2 takes a signal wave of the V phase Vv1*=drt(1−d0−d4) or less, or a signal wave of the V phase Vv2*=drt+dst(d0+d4) or more, a switching signal Gyp is activated. When the carrier C2 takes a signal wave of the W phase Vw1*=drt(1−d0−d4−d6) or less, or a signal wave of the W phase Vw2*=drt+dst(d0+d4+d6) or more, a switching signal Gwp is activated.

Thus, since conventionally the dead time is not taken into consideration, in order to realize the zero-current switching in the current-source converter, the zero voltage vector (in the example of FIG. 3, the zero voltage vector V0) is always employed in the control of the voltage-source inverter at the timing of switching by the current-source converter. The employment of the zero voltage vector causes a problem that the modulation factor is small as described above. A technique for improving the modulation factor is described below. As described later, however, the time ratio d0 is not necessarily positive below and may be larger than a predetermined negative value. The negative value is specified by later description with reference to FIG. 7.

Figure 4:
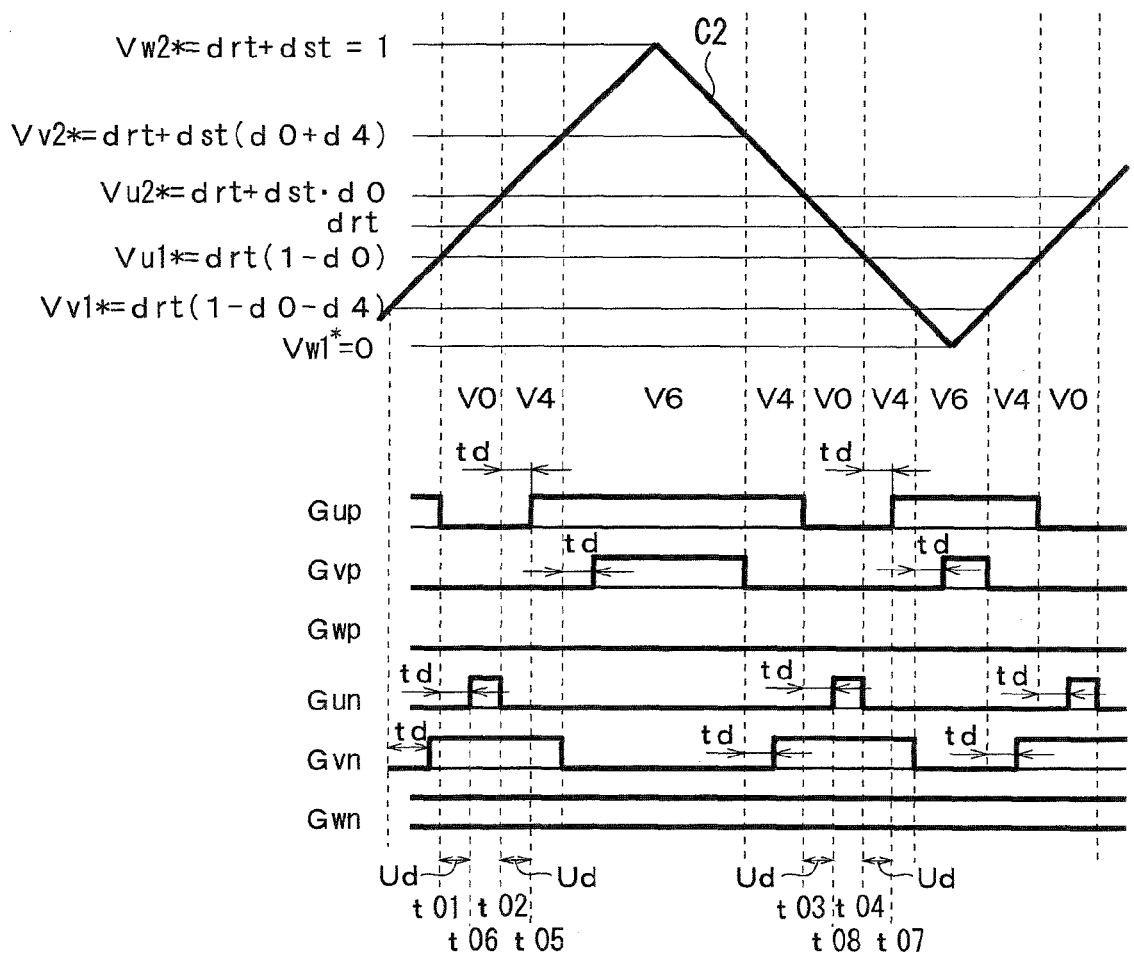
FIG. 4 is a timing chart illustrating a state that switching signals are generated in a case where dead time is provided.

FIG. 4 is a timing chart illustrating a state that the switching signals Gyp and Gyn are generated in a case where the dead time td is provided. There is illustrated here a case where the zero voltage vector V7 near the maximum value and the minimum value of the carrier C2 that is not related to the zero current switch is not employed in order to reduce the switching loss. That is, the time ratio d7 is zero, and the signal waves of the W phase Vw1* and Vw2* take the minimum value and the maximum value (which are values 0 and 1, respectively) of the carrier C2, respectively.

Just before a time point t01 when the carrier C2 takes the signal wave of the U phase Vu1*(=drt(1−d0)) during a rise, the upper arm side switch Qup is in an on state, the upper arm side switch Qup is turned off at the time point t01. The lower arm side switch Qun belonging to the same current path as that of the upper arm side switch Qup is made to shift from the off state to the on state after the dead time td passes since the time point t01. That is, at the time point t06 after the dead time td passes since the time point t01 at which the switching signal Gup falls, a switching signal Gun rises.

The lower arm side switches Qvn and Qwn belonging to the same current path as the upper arm side switches Qvp and Qwp in the off state just before the time point t01 are in the on state from the time point t01 to a time point t02. The time point t02 is a time point when the carrier C2 takes the signal wave Vu2*(=drt+dst·d0) during a rise. That is, the switching signals Gvn and Gwn are "H" between the first time point t01 and the second time point t02.

The lower arm side switch Qun is in the on state just before the second time point t02, and the lower arm side switch Qun is turned off at the second time point t02. The upper arm side switch Qup belonging to the same current path as the lower arm side switch Qun is made to shift from the off state to the on state after the dead time td passes since the second time point t02. That is, the switching signal Gup falls after the dead time td passes since the second time point t02 when the switching signal Gun rises.

Similarly, after the dead time td passes since the switching signal Gyp falls, the switching signal Gvn rises, and after the dead time td passes since the switching signal Gvn falls, the switching signal Gyp rises.

If another time point t03 when the carrier C2 takes the signal wave of the U phase Vu2*(=drt+dst·d0) during a decrease, and a time point t04 when the carrier C2 takes the signal wave of the U phase Vu1*(=drt(1−d0)) during the decrease are replaced with the above time points t01 and t02, respectively, the similar description is also applied.

More concretely, the time points t01 and t03 can be regarded as the first time point when the carrier C2 takes the respective signal waves Vu1* and Vu2*. Further, when the time point t01 is regarded as the first time point, the time point t02 can be regarded as the second time point when the carrier C2 takes the signal wave Vu2* for the first time after the first time point. Further, when the time point t03 is regarded as the first time point, the time point t04 can be regarded as the second time point when the carrier C2 takes the signal wave Vu1* for the first time after the first time point.

All the upper arm side switches Qyp are in off state at a period when the first time points t01 and t03 are commencements and time points t05 and t07 obtained by adding the dead time td to the second time points t02 and t04 corresponding to the first time points, respectively, are termination. Since this period is a period when the unit voltage vectors are isolated, hereinafter, it is called an "isolation period".

At the isolation period, a switching signal Gzn corresponding to the lower arm side switches falls at timing (the time points t02 and t04) when the carrier C2 takes one of the signal waves of the Z phase, and a switching signal Gzp corresponding to the switching signal Gzn rises after the dead time td passes since the aforementioned timing. Further, the switching signals Gzp corresponding to the upper arm side switches falls at timing when the carrier C2 takes the other signal wave of the Z phase (the time points t01 and t03), and the switching signal Gzn corresponding to the switching signal Gzp rises after the dead time td passes since the aforementioned timing. Herein, the Z phase is a maximum phase in the phase voltages Vu, Vv, and Vw, and it corresponds to the U phase in this description.

The signal waves Vu1* and Vu2* of the U phase are signal waves for the maximum phase, and a value obtained by subtracting the signal wave Vu1* from the signal wave Vu2* is equal to the time ratio d0.

Since the zero voltage vector V7 is not employed in order to heighten the modulation factor, the switching signals Gwp and Gwn are "L" and "H", respectively, and neither rise nor fall occurs in both the signals.

FIG. 4 illustrates a voltage vector that would be employed if the dead time td were 0 (hereinafter, referred to as an "original voltage vector"). However, as to a voltage vector that is actually employed (hereinafter, referred to as an "actual voltage vector"), the period when the original voltage vector is employed is eroded from the commencement by the dead time td. However, in the eroded time, merely the lower arm side switch Qun becomes non-conductive, and thus all the upper arm side switches Qup, Qvp, and Qwp remain non-conductive.

Further, also as to the original voltage vector V4 provided next to an original voltage vector V0, the period when it is employed is eroded from the commencement by the dead time td.

Thus, a period Ud when all the upper arm side switches Qup, Qvp, and Qwp are non-conductive for the dead time td is present respectively before and after the period (the time points t06 to t02) when the actual voltage vector V0 is employed. The link current Idc becomes zero also at the period Ud.

In the isolation period includes totally three periods which are the period when the actual voltage vector V0 is employed and the periods Ud before and after that period, the actual voltage vector V4 is isolated in a vicinity where the current-source converter 2 performs switching. When the current-source converter 2 performs switching in the isolation period, the zero-current switching is realized.

In such a manner, the presence of the dead time td is taken into consideration so that the width of the timing when the zero-current switching is realized is made to be wider by the dead time td than the case where the presence of the dead time td is not taken into consideration.

In other words, when the timing of the switching in the current-source converter 2 is set within the isolation period, the zero-current switching is realized. Therefore, the timing of the switching in the current-source converter 2 is shifted from the timing when the carrier C2 takes the current conduction ratio drt.

Such a shift can be realized by various methods, but the following describes a case where the phase of the carrier C1 is relatively shifted from the phase of the carrier C2, so that the timing of the switching in the current-source converter 2 is shifted. In the following description, an amount of the shift of the phase of the carrier C1 from the phase of the carrier C2 is a shift amount tc in a temporal dimension (a delaying direction is positive). When the shift amount tc is converted into the phases of the carriers C1 and C2, it becomes 2π(tc/T0).

Figure 5:
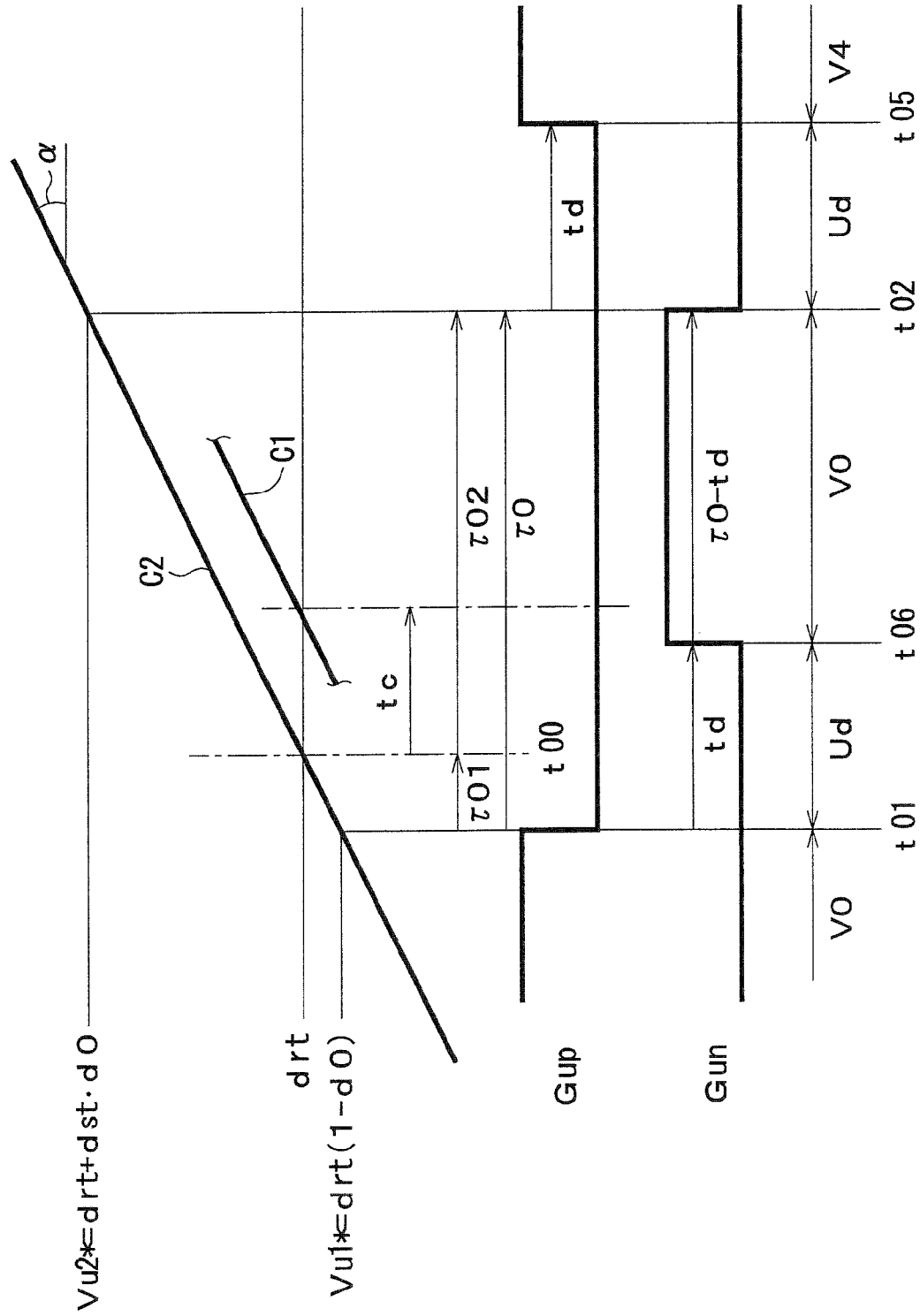
FIG. 5 is a timing chart illustrating behaviors of the switching signals near an isolation period during a rise in the carrier.

FIG. 5 is a timing chart illustrating behaviors of the switching signals Gup and Gun near the isolation period during the rise in the carrier C2. FIG. 5 illustrates a period when the actual voltage vectors V0 and V4 are employed and the period Ud.

Since currently, the timing of the switching in the current-source converter 2 is a time point when the carrier C1 takes the current conduction ratio drt, the current conduction ratio drt is referred to as a commutation reference value drt. Further, the time point when the carrier C2 takes the commutation reference value drt is referred to as a commutation reference time point t00. The timing of the actual switching in the current-source converter 2 is delayed from the commutation reference time point t00 by the shift amount tc when the shift amount tc is positive (however, when the shift amount tc is negative, it advances from the commutation reference time point t00 by an absolute value of the shift amount tc).

The original voltage vector V0, in the time τ0 when it is employed, is present for time T01 before the commutation reference time point t00 and is present for time T02 after the commutation reference time point t00.

When the time τ01 is the dead time td or more, since the commutation reference time point t00 is included in a period when the actual voltage vector V0 is employed, the timing when the current-source converter 2 performs the switching does not have to be shifted from the commutation reference time point t00. Therefore, a case where the time τ01 is shorter than the dead time td is assumed here.

The switching signals Gup and Gun fall at the above-mentioned time points t01 and t02, respectively. Further, it can be said that when the time points t05 and t06, which are delayed from the time points t02 and t01 by the dead time td, respectively, are introduced, the switching signals Gup and Gun rise at the above-mentioned time points t05 and t06. Therefore, the actual voltage vector V0 is employed for a length of time (τ0−td).

Herein, a case where the actual voltage vector V0 is not employed including a case where τ0−td≤0 is described later.

In a conventional technique, the current-source converter 2 would perform the switching at the time point when the carrier C2 takes the current conduction ratio drt without providing the shift amount tc. Since the conventional technique presupposes that the time above-mentioned point when the carrier C2 takes the current conduction ratio drt is present in the period when the actual voltage vector V0 is employed in order to realize the zero-current switching, the signal wave Vu1* should be set so that τ01>td. Similarly, the signal wave Vu2* should be set so that τ02>td during a drop of the carrier C2. As a result, an upper limit of the signal wave Vu1* should be value drt−td·tan α, and a lower limit of the signal wave Vu2* should be value drt+td·tan α (where, tan α is an absolute value of a slope of the carrier C2 with respect to the time). Therefore, when the shift amount tc is not provided like the conventional technique, τ0>2td is required. This means that the time ratio d0 requires 2td·tan α at minimum, and thus an increase in the modulation factor is prevented.

However, as described above, at not only the period when the actual voltage vector V0 is employed but also the period Ud, the link current Idc becomes zero. Therefore, when the timing when the current-source converter 2 performs the switching is within the isolation period defined between the time points t01 to t05, the zero-current switching is realized. That is, even when the time ratio d0 takes a value smaller than 2td·tan α, the timing when the current-source converter 2 performs the switching can be obtained in order to realize the zero-current switching. As a result, the upper limit of the signal wave Vu1* increases, and the lower limit of the signal wave Vu2* decreases, so that the modulation factor can be improved.

The length of the isolation period is a sum of the time τ0 and the dead time td. Therefore, it is enough that the shift amount tc satisfies the following relationship.

$$-\tau 01 < tc < \tau 02 + td \quad (1)$$

When a margin for an error is taken into consideration, it is desirable that the shift amount tc is at the center of the isolation period. From this viewpoint, it is desirable that the shift amount tc takes the following value tc0.

$$tc0 = \frac{\tau 02 - \tau 01}{2} + \frac{td}{2} \quad (2)$$

Also if the time point t03 when the signal wave Vu2* is taken during the decrease in the carrier C2 and the time point t04 when the signal wave Vu1* is taken during the decrease in the carrier C2 are replaced by the time points t01 and t02, respectively, the similar description is applied. Further, since Formula (1) holds even when τ01 and τ02 are interchanged, the relationship that should be satisfied by the shift amount tc is expressed by Formula (1) even when the carriers C1 and C2 rise or drop, and thus the value tc0 does not change.

{In Case where d0=0}

Incidentally, as described above, the period Ud composing the isolation period with the length of the dead time td contributes to the zero-current switching. Therefore, even when the time ratio d0 in which the original voltage vector V0 is employed in one cycle of the carrier C2 is set to zero, the isolation period is present between the periods when the actual voltage vector V4 is employed.

Figure 6:
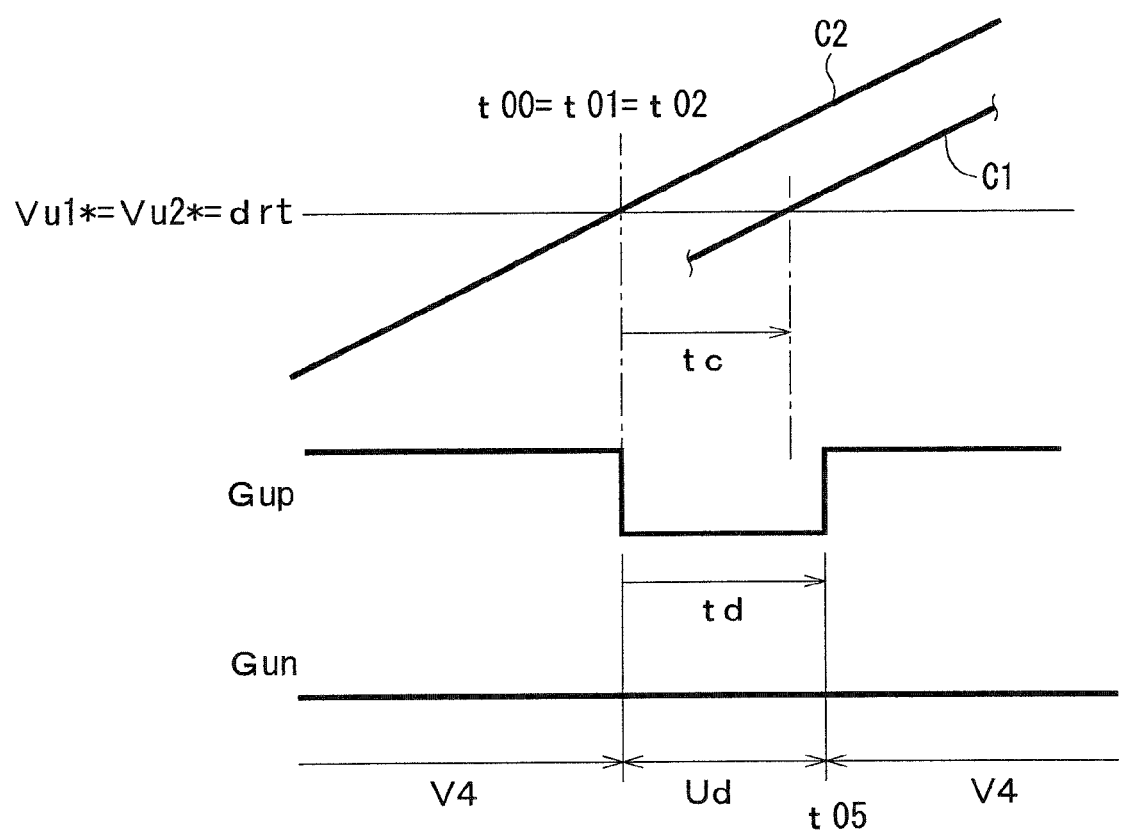
FIG. 6 is a timing chart illustrating the behaviors of the switching signals near the isolation period during a rise in the carrier.

FIG. 6 is a timing chart illustrating behaviors of the switching signals Gup and Gun near the isolation period during the rise in the carrier C2, and illustrates a case where the time ratio d0 takes zero. In this case, τ0=0, and the time points t00, t01, and t02 match, and both the signal waves Vu1* and Vu2* are equal to the commutation reference value drt. Therefore, for convenience, it can be seen the time point t06 match with the time points t00, t01, and t02.

As described above, the switching signal Gup falls at the time t01, and rises at the time t05 during the rise in the carrier C2. Therefore, the switching signal Gup is "L" for the time points t01 to t05. This similarity is shown on the drop in the carrier C2.

Further, the switching signal Gun rises at the time t06, and falls at the time t02. Therefore, practically the switching signal Gun does not rise nor fall in the isolation period, the period of "H" is eliminated, and "L" is maintained. Also in this case, as described above, the length of the isolation period (td+d0·cot π) is maintained (since the time ratio d0=0).

Also in this case, the shift amount tc takes the value tc0, so that the zero current switch can be realized. Since the time ratio d0 is zero, both the time τ01 and the time τ02 are zero, and tc0=td/2.

{In Case where d0<0}

Figure 7:
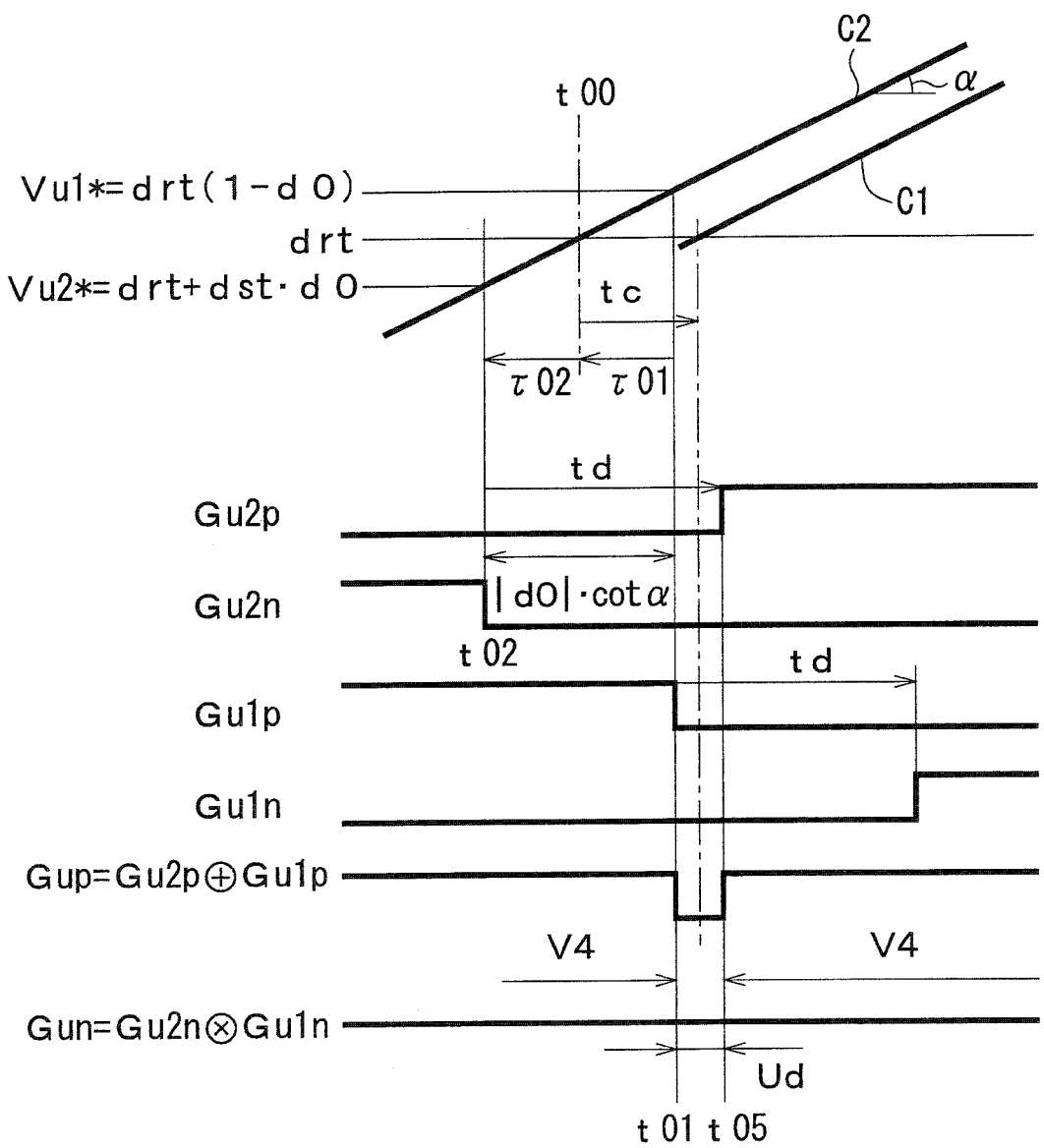
FIG. 7 is a timing chart illustrating the behaviors of the switching signals near the isolation period during a rise in the carrier.

FIG. 7 is a timing chart illustrating behaviors of the switching signals Gup and Gun near the isolation period during the rise in the carrier C2, and illustrates a case where the time ratio d0 is negative.

According to the above description, the time ratio d0 is a ratio of the length of the unit voltage vector V0 to be employed in one cycle of the carrier, and this description is not inconsistent with that the time ratio d0 is negative. However, when the time ratio d0 is reconsidered as d0=1−d4−d6 (where, d4, d6>0), the time ratio d0 can be treated similarly to the cases shown in FIG. 5 and FIG. 6.

Since d0<0, drt+dst=1, drt>0, and dst>0, the signal wave Vu2*(=drt+dst−d0) becomes smaller than the signal wave Vu1*(=drt(1−d0)).

Due to a reason described later, however, the time ratio d0 have to satisfy the following relationship, and thus FIG. 7 also illustrates the case where this relationship is satisfied.

$$d0 > -td \cdot \tan \alpha \quad (3)$$

As shown in FIG. 7, therefore, the commutation reference time point t00 is later than the time point t02, and the time points t01 and t05 are later than the commutation reference time point t00.

A relationship that is required by a preceding and subsequent relationship between the time points t01 and t05 is described together with a method for generating the switching signals Gup and Gun.

The switching signal Gup corresponds to a logical sum of two switching original signals Gu1*p* and Gu2*p*. That is, when any one of the switching original signals Gu1*p* and Gu2*p* is activated, the switching signal Gup is activated, and when both the switching original signals Gu1*p* and Gu2*p* are inactivated, the switching signal Gup is inactivated.

The switching signal Gun corresponds to a logical product of two switching original signals Gu1*n* and Gu2*n*. That is, when any one of the switching original signals Gu1*n* and Gu2*n* is inactivated, the switching signal Gun is inactivated, and when both the switching original signals Gu1*n* and Gu2*n* are activated, the switching signal Gun is activated.

The switching original signals Gu1*p*, Gu2*p*, Gu1*n*, and Gu2*n* rise to be activated and fall to be inactivated according to the following rule:

the switching original signal Gu2*p* rises when the dead time td passes after the carrier C2 takes the value of the signal wave Vu2* from values smaller than the signal wave Vu2*;

the switching original signal Gu2*p* falls at a time point when the carrier C2 takes the value of the signal wave Vu2* from values larger than the signal wave Vu2*;

the switching original signal Gu2*n* falls at a time point when the carrier C2 takes the value of the signal wave Vu2* from values smaller than the signal wave Vu2*;

the switching original signal Gu2*n* rises when the dead time td passes after the carrier C2 takes the value of the signal wave Vu2* from values larger than the signal wave Vu2*;

the switching original signal Gu1*p* rises when the dead time td passes after the carrier C2 takes a value of the signal wave Vu1* from values larger than the signal wave Vu1*;

the switching original signal Gu1*p* falls at a time point when the carrier C2 takes the value of the signal wave Vu1* from values smaller than the signal wave Vu1*;

the switching original signal Gu1*n* falls at a time point when the carrier C2 takes a value of the signal wave Vu1* from values larger than the signal wave Vu1*; and the switching original signal Gu*n* rises when the dead time td passes after the carrier C2 takes the value of the signal wave Vu1* from values smaller than the signal wave Vu1*.

Therefore, referring to FIG. 7, the switching original signal Gu1*p* falls at the time point t01, and the switching original signal Gu2*p* rises at the time point t05 after the dead time td passes since the time point t02. Since the time point t01 is later than the time point 02 by time |d0|·cot α, td−|d0|·cot α>0 should hold so that the inactive period Ud is present in a period when the switching signal Gup corresponding to the logical sum of the switching original signals Gu1*p* and Gu2*p* is activated. Therefore, the limitation of Formula (3) should be satisfied.

On the other hand, the switching original signal Gu2n falls at the time point t02. The switching original signal Gun rises after the dead time td passes since the time point t01 that is later than the time point t02. Therefore, the switching signal Gun corresponding to the logical product of the switching original signals Gun and Gu2n is not activated at a period when the scale of the signal wave is maintained.

When the current-source converter 2 is switched in the state that the switching original signal Gu1p is inactivated, the zero-current switching is realized. Therefore, a condition that the zero-current switching is realized is as follows with the time point t02 being a reference.

$$|d0| \cdot \cot \alpha < dst \cdot |d0| \cdot \cot \alpha + tc < td \quad (4)$$

FIG. 5 illustrates a case where the original voltage vector V0 is employed in the time τ0 and the time τ0 is longer than the dead time td in order to simplify the description. However, since the case where τ01<td is supposed as described above, the time τ0 is occasionally the dead time td or less. In this case, since the time point t06 is later than the time point t02, only the description with reference to FIG. 5 cannot clarify what the shape of a waveform of the switching signal Gun will be.

It is, however, understood that when the time τ0 is the dead time td or less similarly to the description with reference to FIG. 7, the switching signal Gun does not rise nor fall in the isolation period, and the period of "H" is eliminated, and "L" is maintained.

Even when d0<0 as shown in FIG. 7, the length of the isolation period can be expressed as (td+d0·cot α) with the relationship such that |d0|=−d0 being taken into consideration.

Further, when the dead time td is provided, in order to perform the switching in the current-source converter 2 within the period when the actual voltage vector V0 is employed, τ0=d0·tan α>td should be satisfied as described with reference to FIG. 5. However, the zero-current switching can be realized not only within the period when the actual voltage vector V0 is present but also by the switching in the current-source converter 2 at the period Ud. Therefore, as is understood from Formula (3), the condition to be set on the time ratio d0 can be eased to d0>−td·tan α.

Further, according to the consideration with reference to FIG. 5, since the length of the isolation period is expressed as (td0+d0·cot α) as described above, even when value td/2 is employed as the shift amount tc, the zero-current switching can be realized as long as d0≥0.

Further, it is understood from Formula (4) that also in the case where d0<0 as shown in FIG. 7, even when the value td/2 is employed as the shift amount tc, the zero-current switching can be realized as long as the limitation of Formula (3) is satisfied.

When the value td/2 is employed as the shift amount tc, a relationship such that dst·d0·cot α=drt·d0·cot α=−td/2 can be satisfied. That is, the zero-current switching can be realized even when the signal wave Vu1* is set large up to value drt+(td/2) tan α, and the signal wave Vu2* is set small down to value drt−(td/2) tan α, respectively.

When d0≤td·tan α, the actual voltage vector V0 is not employed. Further, when d0≤0, the original voltage vector V0 is not also employed. However, in cases where d0>0 as shown in FIG. 5, d0=0 as shown in FIG. 6, and d0<0 as shown in FIG. 7 (in these cases, occasionally d0≤td·tan α), the time points when the signal waves Vu1* and Vu2* are taken during the rise in the carrier C2 are regarded as the first time point t01 and the second time point t02, respectively.

Therefore, when a value obtained by subtracting the first time point t01 from the commutation reference time point t00 is redefined as the time τ01, and a value obtained by subtracting the commutation reference time point τ00 from the second time point t02 is redefined as the time τ02 without limiting both the times τ01 and τ02 to positive values, Formula (1) is applied as the limit of the shift amount tc regardless of the positive or negative of the time ratio d0. This represents the same as Formula (4) considering |d0|·drt=−τ01·tan α and |d0·dst=−τ02·tan α when d0<0.

That is, regardless of the positive or negative of the time ratio d0, namely, a magnitude correlation of the signal waves Vu1* and Vu2*, the shift amount tc that satisfies Formula (1) realizes zero-current switching. When the shift amount tc takes the value tc0 calculated by Formula (2), the zero-current switching is realized at the center of the isolation period, and this is desirable from a viewpoint of a margin.

When the shift amount tc takes the value tc0, it is found from Formula (1) that both the values τ01 and τ02 should be larger than the value (−td/2). These conditions satisfy also Formula (3).

{Operation at Time of Regeneration}

In the above description, the link current Idc becomes zero in the isolation period when all the upper arm side switches Qyp are off, and a current does not flow in the current-source converter 2 at the time of the switching in the current-source converter 2. However, when the actual voltage vector V0 is not present and an amount of phase delay of the line current iy is large with respect to a phase voltage Vy, not a return current in the voltage-source inverter 5 but the link current Idc (<0) flows as a regeneration current in the DC buses LH and LL. In this case, it is desirable that a clamping circuit is provided between the DC buses LH and LL. Such a case is described below.

FIG. 8 is a graph illustrating waveforms of the three-phase voltages Vu, Vv, and Vw. Herein, an amplitude is normalized by an absolute value of a line voltage. For convenience, phase areas J1 to J6 are decided as follows:

the phase area J1 (0°≤Ψ≤60°): the phase voltages Vu, Vv, and Vw have a maximum phase, an intermediate phase, and a minimum phase, respectively;

the phase area J2 (60°≤Ψ≤120°): the phase voltages Vu, Vv, and Vw have an intermediate phase, a maximum phase, and a minimum phase, respectively;

the phase area J3 (120°≤Ψ≤180°): the phase voltages Vu, Vv, and Vw have a minimum phase, a maximum phase, and an intermediate phase, respectively;

the phase area J4 (180°≤Ψ≤240°): the phase voltages Vu, Vv, and Vw have a minimum phase, an intermediate phase, and a maximum phase, respectively;

the phase area J5 (240°≤Ψ≤300°): the phase voltages Vu, Vv, and Vw have an intermediate phase, a minimum phase, and a maximum phase, respectively; and the phase area J6 (300°≤Ψ≤360°): the phase voltages Vu, Vv, and Vw have a maximum phase, a minimum phase, and an intermediate phase, respectively.

Provided that phase of the phase voltages Vu, Vv, and Vw are decided based on phases Vu>0 and Vv=Vw<0. Each of the phase areas J1 to J6 has a segment of 60°, and a correspondence relation between phase voltages and the maximum phase, the intermediate phase, and the minimum phase is maintained in each of them.

The line currents iy in the phase areas and upper arm side currents iyp flowing in the upper arm side switches are shown in Tables, as Table 1 is the table when the amount of phase delay of the line current iy with respect to the phase voltage Vy is 0° to 30°, and Table 2 is the table when the amount of phase delay is 30° to 60°. "Phase corresponding to the dead time" in Tables 1 and 2 indicates a phase in which the isolation period is generated by the dead time.

TABLE 1

| Phase area | iu | iv | iw | iup | ivp | iwp | Phase corresponding to dead time |
|---|---|---|---|---|---|---|---|
| J1 | + | − | − | 0 | 0 | 0 | U |
|    | + | + | − | 0 | 0 | 0 |   |
| J2 | + | + | − | 0 | 0 | 0 | V |
|    | − | + | − | 0 | 0 | 0 |   |
| J3 | − | + | − | 0 | 0 | 0 | V |
|    | − | + | + | 0 | 0 | 0 |   |
| J4 | − | + | + | 0 | 0 | 0 | W |
|    | − | − | + | 0 | 0 | 0 |   |
| J5 | − | − | + | 0 | 0 | 0 | W |
|    | + | − | + | 0 | 0 | 0 |   |
| J6 | + | − | + | 0 | 0 | 0 | U |
|    | + | − | − | 0 | 0 | 0 |   |

TABLE 2

| Phase area | iu | iv | iw | iup | ivp | iwp | Phase corresponding to dead time |
|---|---|---|---|---|---|---|---|
| J1 | + | − | + | 0 | 0 | 0 | U |
|    | + | − | − | 0 | 0 | 0 |   |
| J2 | + | − | − | 0 | − | − | V |
|    | + | + | − | 0 | 0 | 0 |   |
| J3 | + | + | − | 0 | 0 | 0 | V |
|    | − | + | − | 0 | 0 | 0 |   |
| J4 | − | + | − | − | 0 | − | W |
|    | − | + | + | 0 | 0 | 0 |   |
| J5 | − | + | + | 0 | 0 | 0 | W |
|    | − | − | + | 0 | 0 | 0 |   |
| J6 | − | − | + | − | − | 0 | U |
|    | + | − | + | 0 | 0 | 0 |   |

Firstly, description is given with reference to Table 1. When the description is given by exemplifying the phase area J1, the phase voltages Vu, Vv, and Vw correspond to the maximum phase, the intermediate phase, and the minimum phase, respectively, and the unit voltage vectors V4 and V6 or further the unit voltage vector V0 are employed as the original voltage vector.

When the amount of phase delay is as described above, polarities of the line currents iu, iv, and iw are positive, negative and negative, or positive, positive, and negative, respectively. In Table 1 (and Table 2), positive and negative polarities of the currents are indicated by + and −, respectively. The line current iv related to the phase voltage Vv corresponding to the intermediate phase takes any one of positive and negative values in the phase area J1. In the phase area J1, a ratio in one cycle of the carrier C2 between the period when the line current iv is positive and the period when it is negative matches with a ratio between the time ratio d6 and the time ratio d4.

Notation about the upper arm side current iyp in Table 1 represents that whether this current flows at the isolation period. With reference to also FIG. 4, when the unit voltage vectors V4 and V6 or further the unit voltage vector V0 are employed as the original voltage vector, the lower arm side switches Qvn and Qwn are conductive in the isolation period. Therefore, the line currents iv and iw flow in the lower arm side switches Qvn and Qwn or diodes Dvn and Dwn. In general, since a current flows to a lower potential side, even when the line current iv is negative, the line current iv flows toward not the DC bus LH but the DC bus LL, and does not flow in the diode Dup on the upper arm side. In Table 1, therefore, it is shown that the upper arm side currents ivp and iwp are noted as "0", and they do not flow.

A sign of the line current iu is maintained as positive via the diode Dun on the lower arm side. This is because the upper arm side switch Qup is turned off, and the diode Dup prevents a current flowing from the DC bus LH to the output terminal Pu. In Table 1, therefore, it is shown that the upper arm side current iup is noted as "0", and it does not flow. Since this is a phenomenon that does not depend on turning-on/off of the lower arm side switch Qun, this does not depend on whether the isolation period includes the period when the actual voltage vector V0 is employed.

This similarity is shown on the other phase areas J2 to J6. That is, when the amount of phase delay is 0° to 30°, the upper arm side currents iup, ivp, and iwp do not flow, the voltage-source inverter 5 performs a powering operation at a period other than the isolation period, and performs a reflux operation at the isolation period.

Next, description is given with reference to Table 2. When the description is given by exemplifying the phase area J1, the phase voltages Vu, Vv, and Vw correspond to the maximum phase, the intermediate phase, and the minimum phase, respectively, and the unit voltage vectors V4 and V6 or further the unit voltage vector V0 are employed as the original voltage vector. Further, since the amount of phase delay is 30° to 60°, the polarities of the line currents iu, iv, and iw are positive, negative, and positive, or positive, negative, and negative, respectively.

When the description is given by exemplifying the phase area J2, the phase voltages Vu, Vv, and Vw correspond to the intermediate phase, the maximum phase, and the minimum phase, respectively, and the unit voltage vectors V6 and V2 or further the unit voltage vector V0 are employed as the original voltage vector. Further, since the amount of phase delay is 30° to 60°, the polarities of the line currents iu, iv, and iw are positive, negative, and negative, or positive, positive, and negative, respectively.

FIG. 9 to FIG. 12 are circuit diagrams illustrating an equivalent circuit of the voltage-source inverter 5 at the isolation period, particularly in a state that the zero voltage vector V0 is not provided as the actual voltage vector (τ0<td), and do not illustrate the switches Qyn and Qyp in the off state.

Figure 9:
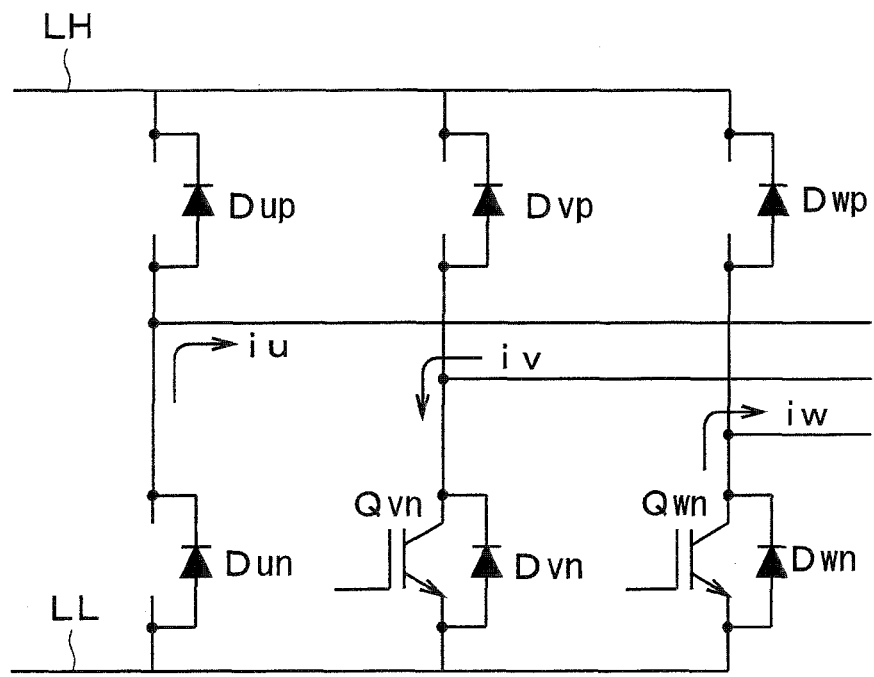
FIG. 9 is a circuit diagram illustrating an equivalent circuit of a voltage-source inverter at the isolation period.
Figure 10:
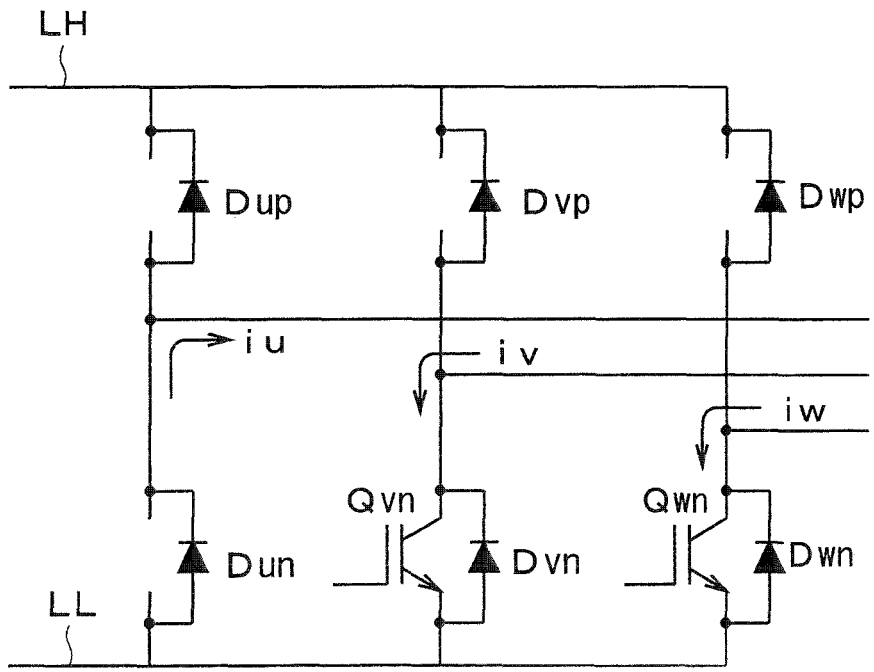
FIG. 10 is a circuit diagram illustrating the equivalent circuit of the voltage-source inverter at the isolation period.

FIG. 9 and FIG. 10 illustrate the equivalent circuit of the voltage-source inverter 5 at the isolation period in the phase area J1, and particularly a case where the isolation period is composed of only the period Ud (see FIG. 4 etc.).

FIG. 11 and FIG. 12 illustrate the equivalent circuit of the voltage-source inverter 5 at the isolation period in the phase area J2, and particularly a case where the isolation period is composed of only the dead time of the V phase.

FIG. 9 illustrates flows of the line currents iu, iv, and iw at the isolation period in a case where the polarities of the line currents iu, iv, and iw are positive, negative, and positive, respectively, in the phase area J1 (the first line in Table 2). Since this case is equivalent to a case where the V phase and the W phase shown on the second line in Table 1 are interchanged, the upper arm side currents iup, ivp, and iwp do not flow.

FIG. 10 illustrates flows of the line currents iu, iv, and iw at the isolation period in a case where the polarities of the line currents iu, iv, and iw are positive, negative, and negative, respectively, in the phase area J1 (the second line in Table 2). Since this case is equivalent to the case shown on the first line in Table 1, the upper arm side currents iup, ivp, and iwp do not flow.

FIG. 11 illustrates flows of the line currents iu, iv, and iw at the isolation period in a case where the polarities of the line currents iu, iv, and iw are positive, negative, and negative, respectively, in the phase area J2 (the third line in Table 2). FIG. 12 illustrates flows of the line currents iu, iv, and iw at the isolation period in a case where the polarities of the line currents iu, iv, and iw are positive, positive, and negative, respectively, in the phase area J2 (the fourth line in Table 2).

In any cases, the polarity of the line current iu is positive, and in the U phase, the upper arm side switch Qup is off. The line current iu, therefore, flows in a lower arm side diode Dun. In a case shown in FIG. 11, the polarity of the line current iv is negative, and both the upper arm side switch Qvp and the lower arm side switch Qvn are off in the V phase. The line current iv, therefore, flows in an upper arm side diode Dvp, and the upper arm side current ivp flows. In Table 2, a symbol "–" indicates a state that the upper arm side switch Qyp is off but the upper arm side current iyp flows in an upper arm side diode Dyp connected in anti-parallel with the switch Qyp. In a case shown in FIG. 12, the polarity of the line current iv is positive, and both the upper arm side switch Qvp and the lower arm side switch Qvn are off in the V phase. The line current iv, therefore, flows in the lower arm side diode Dvn, and the upper arm side current ivp does not flow ("0" is noted on a row of ivp on the fourth line in Table 2).

Further, when the polarity of the line current iw is negative, the lower arm side switch Qwn is on, and the line current iw flows in one of the lower arm side switch Qwn and the upper arm side diode Dwp. Since a current generally flows toward a lower potential side, in the case shown in FIG. 11, the line current iw flows via the upper arm side diode Dwp based on directions of the line currents iu and iv. Therefore, the upper arm side current iwp flows ("–" is noted on a row of iwp on the third line in Table 2). Further, in the case shown in FIG. 12, the line current iw flows via the lower arm side diode Dwn. Therefore, the upper arm side current iwp does not flow ("0" is noted on a row of iwp on the fourth line in Table 2).

This similarity is shown on the other phase areas J3 to J6. That is, when the amount of phase delay is 30° to 60°, the upper arm side currents iup, ivp, and iwp occasionally flow at the isolation period, particularly, the period when the actual voltage vector V0 is not provided. The voltage-source inverter 5 performs the powering operation at a period other than the isolation period, and performs the reflux operation or the regeneration operation at the isolation period.

{Improvement of Current Conduction Period of the Current-Source Converter 2}

If the timing when the current-source converter 2 performs the switching matches with the commutation reference time point t00 and should be present within the period provided with the actual voltage vector V0 without providing the shift amount tc, the upper limit of the signal wave Vu1* should be value drt−td·cot α, and the lower limit of the signal wave Vu2* should be value drt+td·cot α. This not only limits the modulation factor in the voltage-source inverter 5 but also prevents improvement in the current conduction ratio in the current-source converter 2.

Figure 13:
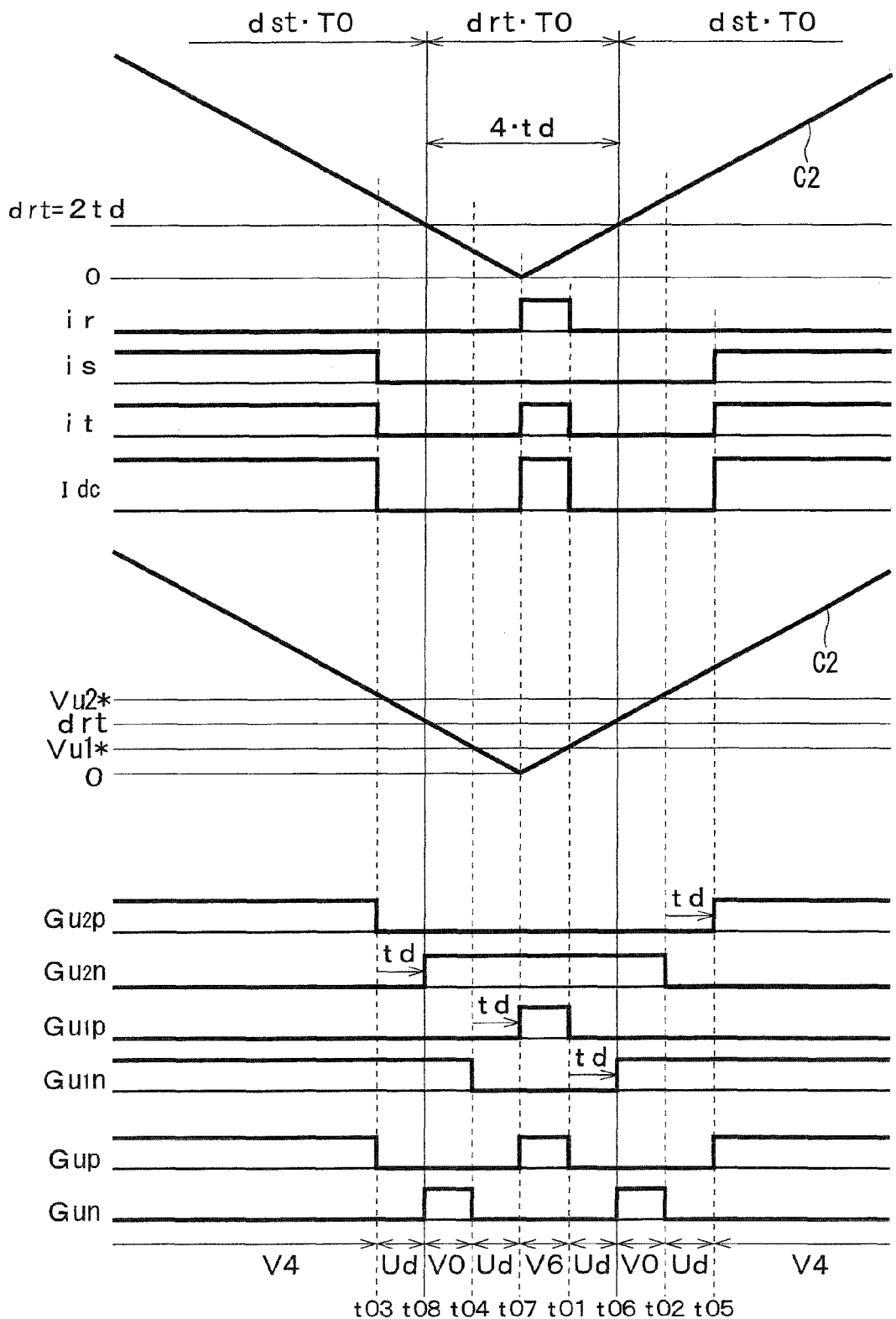
FIG. 13 is a graph describing the operation of the power converting apparatus in a case where a current conduction ratio is comparatively small.
Figure 14:
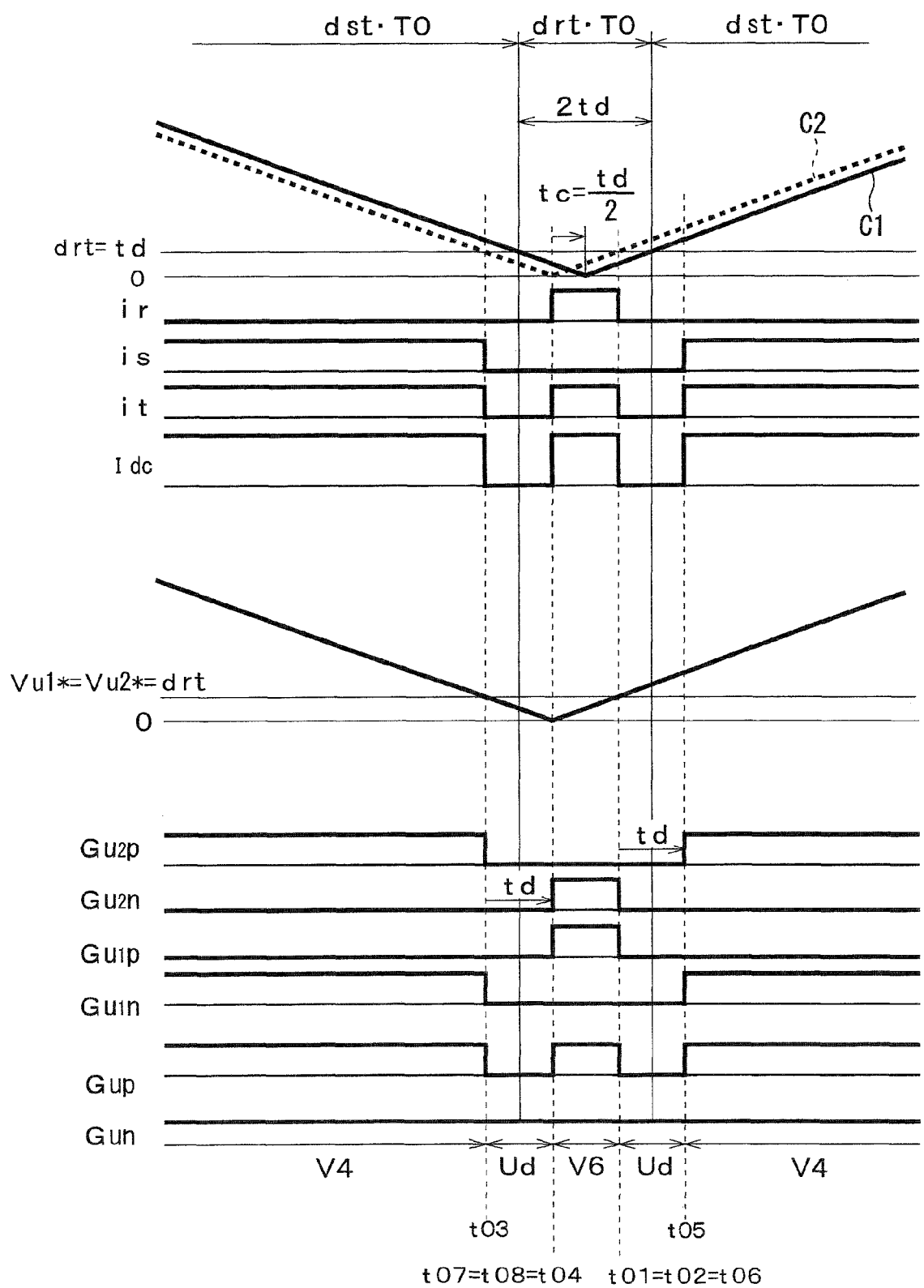
FIG. 14 is a graph describing the operation of the power converting apparatus in the case where the current conduction ratio is comparatively small.

FIG. 13 and FIG. 14 are graphs describing an operation of the power converting apparatus in a case where the current conduction ratio drt is comparatively small. In order to easily show the effect of this application, only a vicinity of the period drt·T0 is enlarged to be shown. Since drt<dst, the phase voltage Vr is smaller than the phase voltage Vs and corresponds to the intermediate phase.

FIG. 13 is related to a conventional technique, and illustrates a case where the carrier C2 for the voltage-source inverter 5 is also used as a carrier for the current-source converter 2, and a case where the zero-current switching is realized at the period when the actual voltage vector V0 is employed.

When a time point after the dead time td passes since the time point t03 is determined as a time point t08, the commencement of the period when the actual voltage vector V0 is employed during the drop in the carrier C2 is the time point t03, and the termination is the time point t04.

Further, the actual voltage vector V6 is employed at a period when the switching signal Gup is activated between the time point t08 and the time point t02, and the switching signal Gup is activated at the time point t07 after the dead time td passes since the time point t04, and is inactivated at the time point t01.

Since both the time points t01 and t04 are time points when the carrier C2 takes the signal wave Vu1*, Vu1*td·tan α should be satisfied in order to prevent the period when the actual voltage vector V6 is employed from being eroded by the dead time td.

Further, the commencement of the period when the actual voltage vector V0 is employed during the rise in the carrier C2 is the time point t06, and as the result, the carrier C2 employs the current conduction ratio drt at this time point. FIG. 13 illustrates a case where the current conduction ratio drt takes a lower limit, and thus Vu1*=Vu2*=td·tan α.

In the conventional technique, since the zero-current switching is realized at the period when the actual voltage vector V0 is employed, a length between the time points t01 and t06 require the dead time td at least, and thus drt≥Vu1*+td·tan α≥2td·tan α. In other words, the lower limit of the current conduction ratio drt is 2td·tan α. As a result, the length of the period drt·T0 requires a length that is four or more times as long as the dead time td (4·td).

On the contrary, when this embodiment is used, the actual voltage vector V0 does not have to be employed. When the carrier C1 that is delayed from the carrier C2 for the voltage-source inverter 5 by the shift amount tc=td/2 is employed for the current-source converter 2, the lower limit of the current conduction ratio drt can be reduced to td·tan α as described later.

FIG. 14 is related to this embodiment, and illustrates a case where the carriers C2 and C1 are employed for the current-source converter 2 and the voltage-source inverter 5, respectively, and the zero-current switching is realized.

When the actual voltage vector V0 is not employed, as described in FIG. 6, Vu1*=Vu2*=drt. In order to realize the zero-current switching during the drop in the carrier C2, Vu1*≥td·tan α is enough for preventing the dead time td from eroding the actual voltage vector V6, and thus drt=Vu1*≥td·tan α. In other words, the lower limit of the current conduction ratio drt is td·tan α. As a result, the length of the period drt·T0 requires only a length that is twice or more as long as the dead time td (2·td).

Thus, in the conventional technique, the modulation factor is td/(4·td) and 25% at a period when the current-source converter 2 outputs the phase voltage Vr that is the intermediate phase, but in this embodiment, the modulation factor is td/(2·td) and thus is improved to 50%. This is desirable from a viewpoint that the modulation factor in carrier one cycle is improved.

Such broadening of the lower limit of the current conduction ratio is desirable from a viewpoint of not only heightening of the modulation factor but also suppressing of harmonic components of the line currents ir, is, and it.

FIG. 15 is a graph describing an operation in the current-source converter 2. The upper-stage graph shows the three-phase voltages Vr, Vs, and Vt as input phase voltages, the middle-stage graph shows line current conduction ratios dr, ds, and dt, and the lower-stage graph shows the line currents ir, is, and it as input line currents.

FIG. 2 illustrates an ideal case where the current conduction ratios dr, ds, and dt of the line currents continuously fluctuate, but a lower limit is present in the current conduction ratios of the line currents corresponding to intermediate phase as described above. The graphs in FIG. 15 are drawn with this lower limit being reflected, and a difference in level occurs in a vicinity where the current conduction ratio of the line current corresponding to the intermediate phase becomes 0 in the waveform representing the line currents conduction ratio. A difference in level occurs in a sine wave of the waveforms of the line currents ir, is, and it due to the difference in level of the current conduction ratio. Distortion of the line currents ir, is, and it causes harmonic components.

The difference in level of the current conduction ratio is caused by the lower limit of the current conduction ratio of the line current corresponding to the intermediate phase. Therefore, it is obvious that when the lower limit is reduced as described above, the difference in level becomes small. Therefore, when the shift amount tc is set to td/2 like this embodiment, the lower limit of the current conduction ratio of the line current corresponding to the intermediate phase is broadened, and thus the harmonic components of the line currents ir, is, and it to be input into the current-source converter 2 are suppressed.

Figure 16:
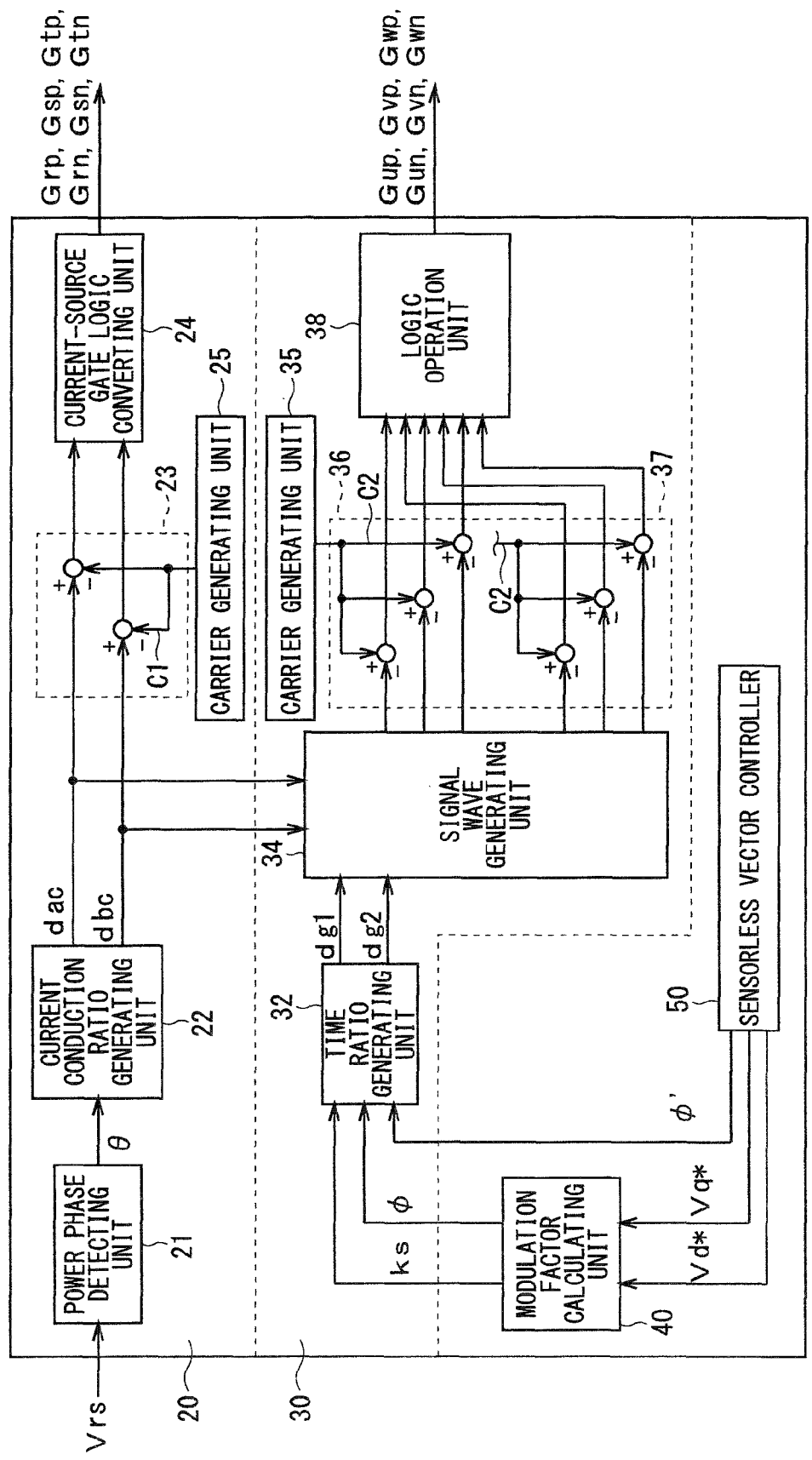
FIG. 16 is a block diagram illustrating conceptual one example of a concrete internal constitution of a controller.

FIG. 16 is a block diagram illustrating conceptual one example of a concrete internal constitution of a controller 100 for making the above control. The controller 100 can be employed as a control device 9 in FIG. 1. The controller 100 includes a converter controller 20, an inverter controller 30, a modulation factor calculating unit 40, and a sensorless vector controller 50. A three-phase motor is assumed as the three-phase load 6 (see FIG. 1).

The converter controller 20 has a power phase detecting unit 21, a current conduction ratio generating unit 22, a comparator 23, a current-source gate logic converting unit 24, and a carrier generating unit 25.

The power phase detecting unit 21 detects, for example, a line voltage Vrs, detects phase angles θ of the three-phase voltages to be applied to the input terminals Pr, Ps, and Pt, respectively, and outputs them to the current conduction ratio generating unit 22.

The current conduction ratio generating unit 22 generates the current conduction ratios dac and dbc based on the received phase angles θ. In the above example, the current conduction ratios dac and dbc correspond to the current conduction ratios dst and drt, respectively.

The carrier generating unit 25 generates the carrier C1. The comparator 23 outputs a result of comparing the carrier C1 with the current conduction ratios dac and dbc, and the current-source gate logic converting unit 24 generates switching signals Grp, Gsp, Gtp, Grn, Gsn, and Gtn based on the result.

The inverter controller 30 has a time ratio generating unit 32, a signal wave generating unit 34, a carrier generating unit 35, a comparator 36, and a logic operation unit 38.

The time ratio generating unit 32 generates the time ratios dg1 and dg2 of the voltage-source inverter 5 based on the modulation factor ks received from the modulation factor calculating unit 40, a control phase angle φ, and a command phase angle φ" received from the sensorless vector controller 50. In the above example, the time ratios dg1 and dg2 correspond to the time ratios d4 and d6. The time ratio d0 is easily obtained as (1−d4−d6).

The signal wave generating unit 34 generates signal waves based on the time ratios dg1 and dg2 and the current conduction ratios dac and dbc. In the above example, signal waves Vu1*, Vv1*, Vw1*, Vu2*, Vv2*, and Vw2* are generated. Since the generation can be realized by a technique equivalent to the technique for generating conventional signal waves, details thereof are omitted.

The carrier generating unit 35 generates the carrier C2. The signal wave is compared with the carrier C2 in the comparator 36, and the result and the dead time td are subject to the operation in the logic operation unit 38. According to this operation, the logic operation unit 38 generates the switching signals Gup, Gyp and Gwp on the upper arm side and the switching signals Gun, Gvn and Gwn on the lower arm side. At this time, as described above, the switching original signals Gy1p, Gy2p, Gy1n, and Gy2n are once generated. Since the logic operation unit 38 is configured easily by a well-known technique, details thereof are omitted here.

The modulation factor calculating unit 40 receives a d-axis voltage command Vd* and a q-axis voltage command Vq* from the sensorless vector controller 50, and calculates the modulation factor ks and the control phase angle φ so as to output them to the time ratio generating unit 32.

The sensorless vector controller 50 calculates a rotating angle velocity ω and the command phase angle φ' of a motor based on the line currents iu, iv, and iw flowing from the connection points Pu, Pv, and Pw to the three-phase load 6. Based on these and a rotating angle velocity command ω* and a duty D which are input from the outside, the d-axis voltage command Vd* and the q-axis voltage command Vq* are generated.

The carrier C1 is obtained by shifting the carrier C2 by the shift amount tc with a time passing direction being positive. Therefore, the carrier generating unit 25 can be substituted with a phase device for delaying the carrier C2 by a predetermined phase. Even when the shift amount tc is negative and the carrier C1 advances from the carrier C2 by a phase amount $2\pi(|tc|/T0)$, the carrier C1 can be practically generated through delay by a phase amount $2\pi(1+tc/T0)$.

{Setting of the Shift Amount tc in which Delay of the Operation of Element is Taken into Consideration}

The description above refers to a case where the switch devices Sxp and Sxn and the switches Qyp and Qyn are conductive/non-conductive without being delayed with respect to the active/inactive state of the switching signals Gxp, Gxn, Gyp, and Gyn. The following describes setting of the shift amount tc in consideration of a case where the switch devices Sxp and Sxn and the switches Qyp and Qyn are delayed with respect to the active/inactive state of the switching signals Gxp, Gxn, Gyp, and Gyn.

Figure 17:
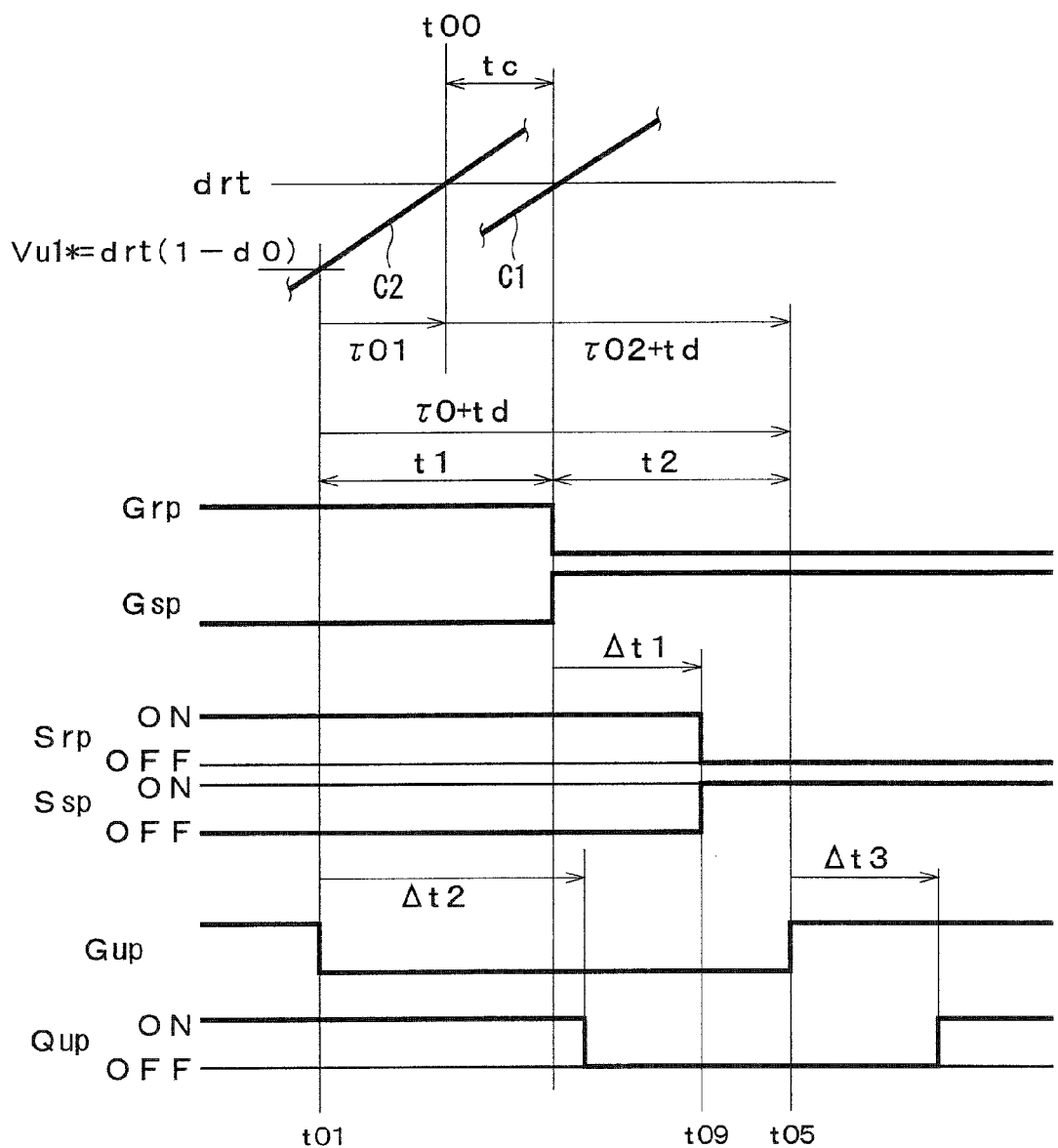
FIG. 17 is a graph illustrating the operations of the current-source converter and the voltage-source inverter.

FIG. 17 is a graph illustrating the operations of the current-source converter 2 and the voltage-source inverter 5. The drawing illustrates an enlarged vicinity of the commutation reference time point t00 during the rise in the carrier C2. For simplification, the case where τ01, τ02>0 is illustrated similarly to FIG. 3.

With reference also to FIG. 5, the signal wave Vu1*=drt(1−d0) is employed at the time point t01 during the rise in the carrier C2. The switching signal Gup is inactivated between the time points t01 to t05. On the other hand, the switching signal Grp falls and the switching signal Gsp rises at the commutation reference time point t00.

The on/off of the switch devices Srp and Ssp in the current-source converter 2 is delayed from the shift of the switching signals Grp and Gsp (rise/fall) by delay time Δt1 (>0). Therefore, time point t09 when the switch devices Srp and Ssp are switched is later than the commutation reference time point t00 by a sum of the shift amount tc and the delay time Δt1.

In order to perform the zero-current switching like this embodiment, the time point t09 should be within a period when the upper arm side switch Qup is off. In consideration of that the on/off operation of the upper arm side switch Qup is delayed from the activation/inactivation of the switching signal Gup, the condition for setting of the time point t09 becomes most stringent in the following case. That is, in this case, delay time between the time point t01 when the switching signal Gup falls and time when the upper arm side switch Qup is turned off takes a maximum value Δt2, and delay time between the time point t05 when the switching signal Gup rises and time when the upper arm side switch Qup is turned on takes a minimum value Δt3.

When a lower limit value Δt1(min) and an upper limit value Δt1(max) of the delay time Δt1, the time t1=τ01+tc, and the time t2=τ02+td−tc are introduced, a condition for the time point t09 being within the period when the upper arm side switch Qup is off is as follows with reference to the time point t01.

$$\Delta t2 \leq t1+\Delta t1(\min), t1+\Delta t1(\max) \leq t1+t2+t3 \therefore \Delta t2-\Delta t1(\min) \leq t1, \Delta t1(\max)-\Delta t3 \leq t2 \therefore \Delta t2-\Delta t1(\min)-\tau 01 \leq tc \leq \Delta t3-\Delta t1(\max)+\tau 02+td \therefore \Delta t2-\Delta t1(\min)-tc \leq \tau 01, tc-\Delta t3+\Delta t1(\max)-td \leq \tau 02 \quad (5)$$

A condition expressed by the following Formulas is required for completing the above Formulas when the shift amount tc=td/2.

$$\Delta t2-\Delta t1(\min)-td/2 > \tau 01, \Delta t1(\max)-\Delta t3-td/2 \leq \tau 02 \quad (6)$$

Second Embodiment

The first embodiment describes the case where the current-source converter 2 supplies the link current Idc to the voltage-source inverter 5. In simple description, the current-source converter 2 functions as a rectifying unit for rectifying the three-phase voltages Vr, Vs, and Vt that are alternating voltages with the commutation due to the switching of the switch devices Sm, Ssn, Stn, Srp, Ssp, and Stp so as to apply the link current Idc.

Such a consideration can be applied also to circuits disclosed in Japanese Patent No. 5045716, Japanese Patent Application Laid-Open No. 2011-193678, and Yoshiya Ohnuma, Jun-ichi Itoh, "Basic Investigation and Capacitance Reduction Method of a Novel Single-Phase to Three-Phase Power Converter", The papers of Technical Meeting on Semiconductor Power Converter, IEE Japan, SPC-08-162 (2008).

Figure 18:
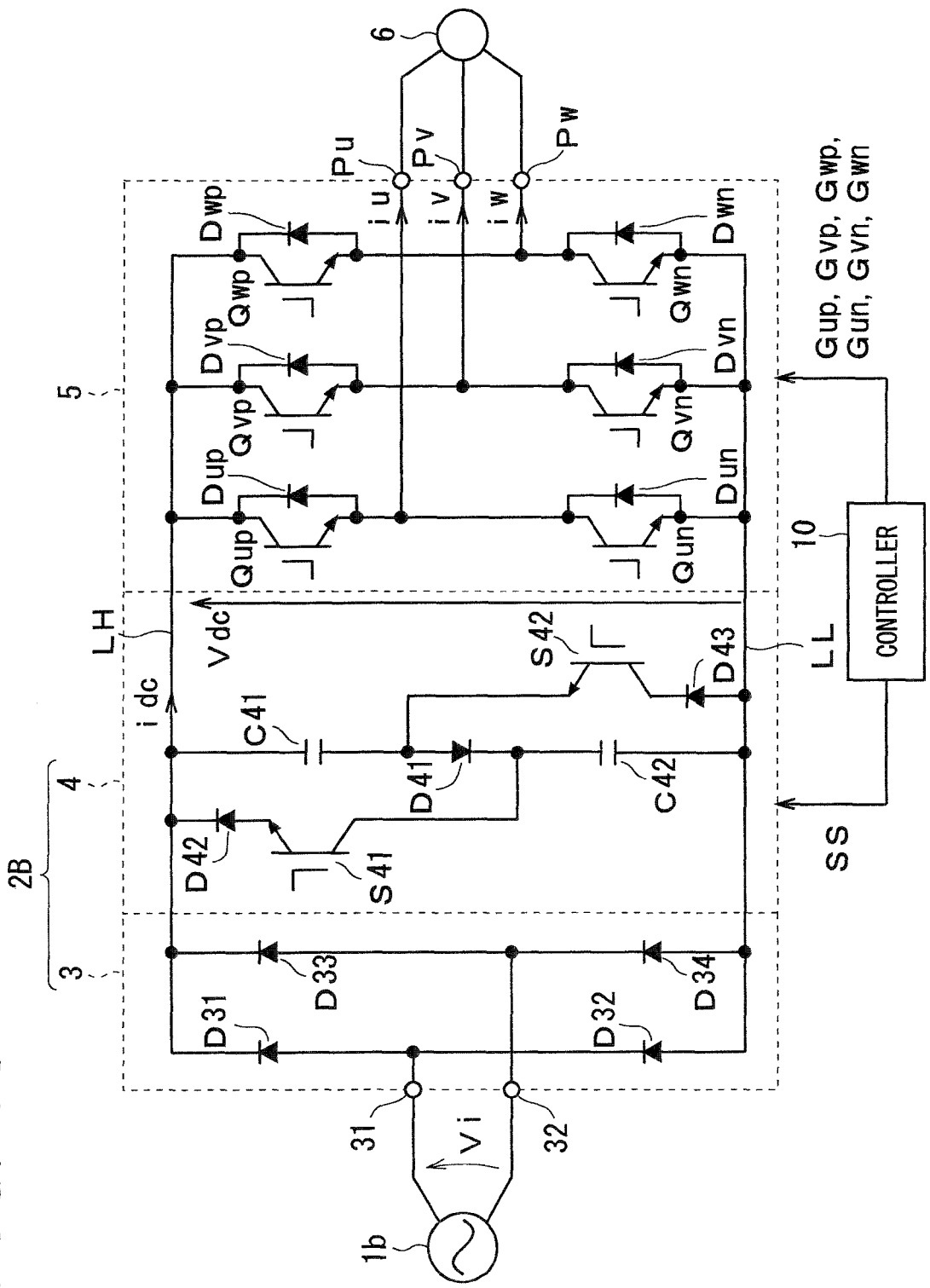
FIG. 18 is a circuit diagram illustrating a conventional single-phase/three-phase direct converting apparatus.

FIG. 18 is a circuit diagram illustrating a simplified single-phase/three-phase direct converting apparatus (FIG. 1 in Japanese Patent No. 5045716) disclosed in Japanese Patent No. 5045716. Further, symbols given to the components are changed into symbols related to this application.

A single-phase diode rectifier 3 is connected to a single-phase alternating power supply 1b via a pair of input terminals 31 and 32, and has diodes D31 to D34. The diodes D31 to D34 compose a bridge circuit, and rectify a single-phase voltage Vi input from the single-phase alternating power supply 1b.

A non-linear capacitor circuit 4 has a plurality of capacitors C41 and C42, diodes D41 to D43 and switch devices S41 and S42. The switching of the switch devices S41 and S42 is controlled by a signal SS. The signal SS and the switching signals Gxp, Gxn, Gyp, and Gyn are output from a controller 10.

Since both the configuration and the operation of the non-linear capacitor circuit 4 are described in detail in publicly-known Japanese Patent No. 5045716, details thereof are omitted here. In short, a current flows from the DC bus LH via the capacitors C41 and C42 and the diode D41 to the DC bus LL, and the capacitors C41 and C42 are charged in series. Further, the capacitors C41 and C42 discharge to the DC buses LH and LL in parallel to each other through the conduction of the switch devices S41 and S42.

That is, it can be understood that the capacitors C41 and C42 function as the charge and discharge elements, and the switch devices S41 and S42 control the discharge from the charge and discharge elements to the DC buses LH and LL. Further, it can be understood that current to be input into input terminals 31 and 32, and discharge current of the capacitors C41 and C42 as the charge and discharge element are commutated and output by the switching of the switch devices S41 and S42.

The non-linear capacitor circuit 4 can be recognized as a buffer unit that is interposed between a single-phase diode rectifier 3 as a diode bridge and the voltage-source inverter 5. Further, the buffer unit with the single-phase diode rectifier 3 together functions as a rectifying unit 2B for rectifying the single-phase voltage Vi as an alternating voltage so as to apply the link current Idc with the commutation caused by the switching of the switch devices S41 and S42.

As to such rectifying unit 2B, it is also desirable that, similarly to the first embodiment, the link current Idc is zero at time of the switching operation of the switch devices S41 and S42. The switching of the switch devices S41 and S42 is decided as follows.

Figure 19:
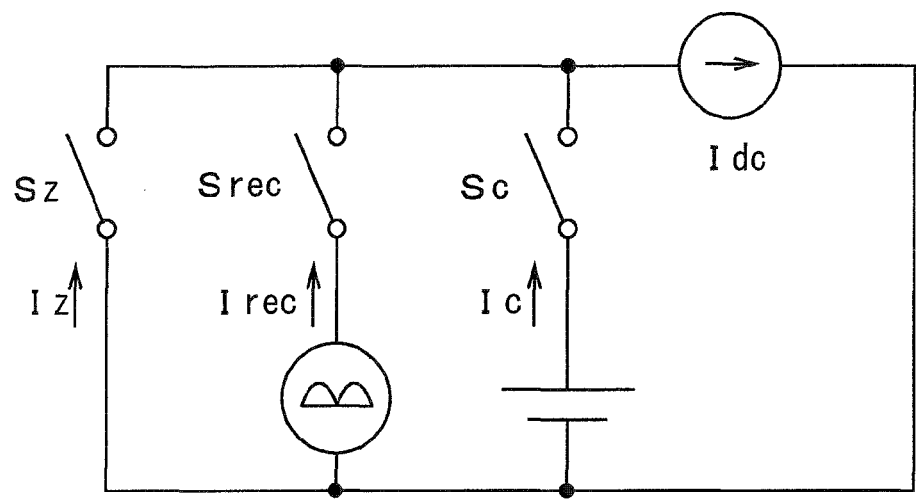
FIG. 19 is a circuit diagram illustrating an equivalent circuit of the single-phase/three-phase direct converting apparatus in FIG. 18.
Figure 20:
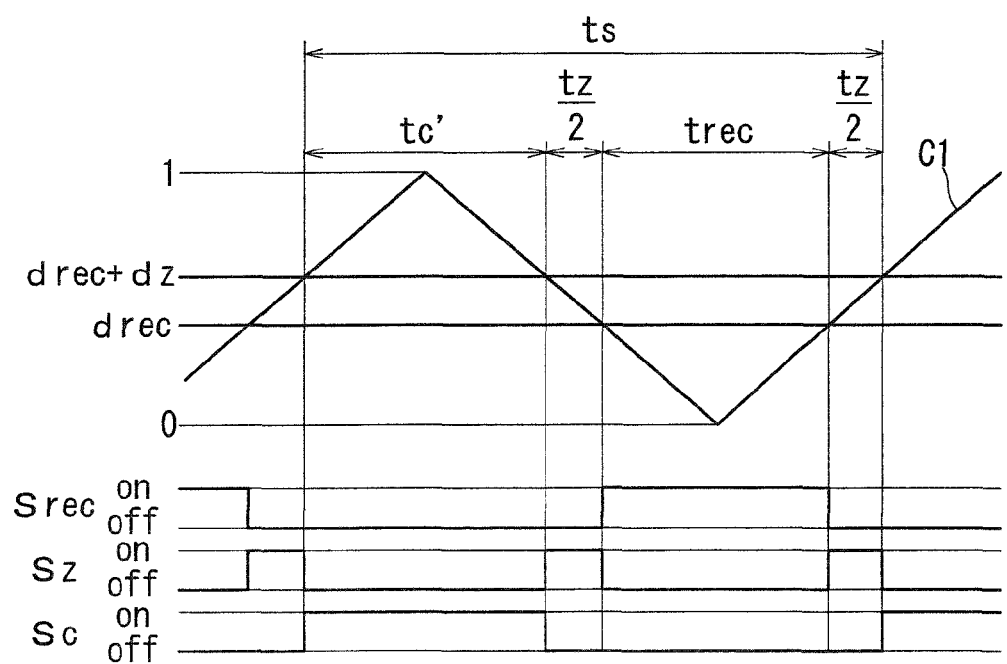
FIG. 20 is a timing chart illustrating an operation of the equivalent circuit in FIG. 19.

FIG. 19 illustrates an equivalent circuit of a single-phase/three-phase direct converting apparatus (FIG. 2 in Japanese Patent No. 5045716) disclosed in Japanese Patent No. 5045716. FIG. 20 is a timing chart illustrating the operation of the equivalent circuit (FIG. 4 in Japanese Patent No. 5045716) (however, the carrier denoted by a symbol "C" in Japanese Patent No. 5045716 is shown as the carrier C1 in view of the first embodiment of this application. Further, since a period tc in Japanese Patent No. 5045716 is different from the shift amount tc of this application, it is described as a period tc' in FIG. 20 of this application).

With reference to FIG. 18 and FIG. 19, the link current Idc is assigned to a current Ic flowing in the capacitors C41 and C42, the currents Irec flowing in the single-phase diode rectifier 3, and the current Iz flowing at a period when the voltage-source inverter 5 operates in the zero voltage vector.

In the equivalent circuit, the current Idc is treated as a current source, and the currents Ic, Irec, and Iz are treated as the currents that flow through the conduction of the switches Sc, Srec, and Sz. The switches Srec, Sc, and Sz are controlled so that any one of them is always conductive.

Current distribution factors of the currents Irec, Ic, and Iz are denoted by drec, dc, and dz. The current distribution factors drec, dc, and dz can be regarded also as ratios of the current conduction period of the switches Srec, Sc, and Sz with respect to a predetermined period (for example, one cycle of the carrier C1 described in the first embodiment). A relationship such that dc+drec+dz=1 is satisfied.

Since the single-phase diode rectifier 3 does not have the switch devices, the current distribution factor drec of the current Irec flowing therein is decided by the current distribution factor dc. Further, the current distribution factor dz is set depending on the operation of the voltage-source inverter 5. In this embodiment, therefore, the commutation operation timing of the rectifying unit is decided only by the current distribution factor dc.

When this is applied to FIG. 20, since the timing when the switch Sc is turned on/off is a timing when the carrier C1 takes a signal wave (drec+dz), this timing can be regarded as timing when the carrier C1 takes a value (1−dc=drec+dz).

Therefore, when the commutation reference value drt is regarded as a commutation reference value (1−dc) in the first embodiment, also in this embodiment, the operations of the rectifying unit and the voltage-source inverter similar to those in the first embodiment can be provided. Concretely, considering that, for example, dst=1−drt, symbols drt and dst are replaced with symbols 1-dc and dc in FIG. 4 to FIG. 7, FIG. 14 and FIG. 17 of this application.

Therefore, even when the current distribution factor dz is set to 0, the link current Idc can be set to 0 at the timing when the switch Sc is turned on/off, so that the modulation factor in the voltage-source inverter 5 can be improved while the zero-current switching is realized.

Concretely, in Japanese Patent No. 5045716, the carrier C1, which is obtained by shifting the carrier C to be employed for the switching of the voltage-source inverter 5 (detailed in the first embodiment) by the shift amount tc, is employed as the carrier for obtaining the signal SS.

The timing when the zero current is desired to be retained is not the timing when the switch devices S41 and S42 are switched (this is also the timing when the signal SS shifts) but the timing when the switch Sc in the equivalent circuit is turned on/off. Therefore, when this embodiment is carried out, the value drec to be compared with the carrier C1 does not have to be changed into value drec+dz for setting activation/inactivation of the signal SS.

Since the generation of the second carrier C1 is realized easily by delaying the carrier C using the phase device described in the first embodiment, details thereof are omitted. The controller 10 modified in such a manner can be regarded as a rectifying unit controller for allowing not only the inverter controller 30 in the first embodiment but also the rectifying unit 2B to perform the above-mentioned commutation. That is, the controller 10 functions as the power conversion control device of this application.

Similarly, the technique of the first embodiment can be applied also to the circuit described in Japanese Patent Application Laid-Open No. 2011-193678.

Figure 21:
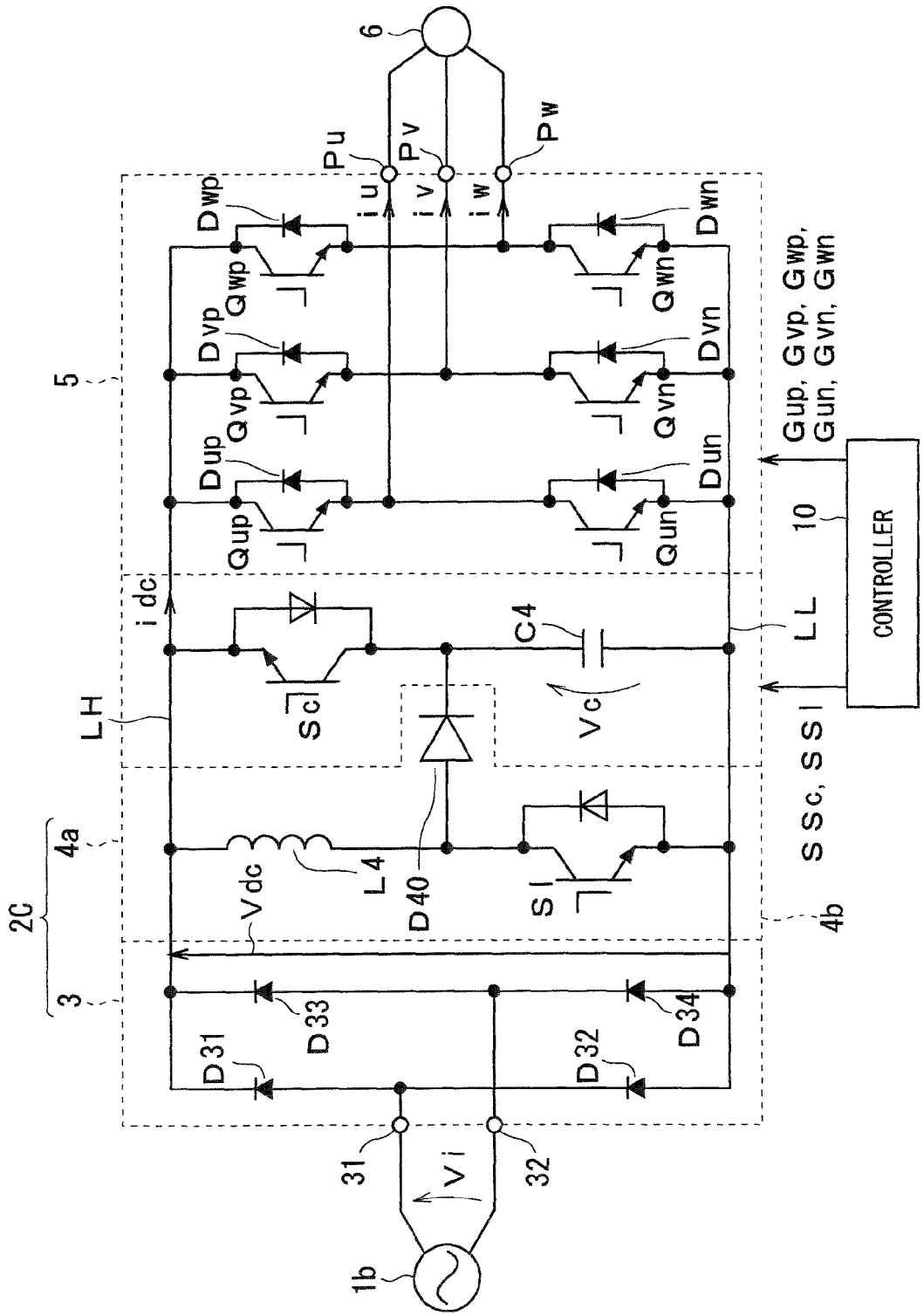
FIG. 21 is a circuit diagram illustrating a conventional single-phase/three-phase direct converting apparatus.

FIG. 21 is a circuit diagram illustrating a simplified single-phase/three-phase direct converting apparatus (FIG. 1 in Japanese Patent Application Laid-Open No. 2011-193678) disclosed in Japanese Patent Application Laid-Open No. 2011-193678. Further, symbols given to the components are changed into symbols related to this application.

In this converting apparatus, a buffer circuit 4a includes a capacitor C4, and power is transmitted/received with the DC buses LH and LL. A booster circuit 4b boosts a rectified voltage Vdc so as to charge the capacitor C4.

The buffer circuit 4a further includes the switch Sc configured by a diode, and a transistor connected in anti-parallel. The switch Sc is connected to the capacitor C4 on the side of the DC bus LH between the DC buses LH and LL in series. The anti-parallel connection means connection in parallel with forward directions being opposite to each other. Concretely, the forward direction of the transistor is a direction from the DC bus LL toward the DC bus LH, and the forward direction of the diode is a direction from the DC bus LH toward the DC bus LL.

The booster circuit 4b includes a diode D40, a reactor L4, and a switch Sl. The diode D40 has a cathode and an anode, and the anode is connected between the switch Sc and the capacitor C4. The reactor L4 is connected between the DC bus LH and the cathode. The switch Sl is connected between the DC bus LL and the cathode. The switch Sl is constituted by a transistor and a diode connected to each other in anti-parallel. Such a configuration is known as a so-called boost chopper. The capacitor C4 is charged by the booster circuit 4b.

The switching of the switches Sc and Sl is controlled by signals SSc and SSl. The signals SSc and SSl are output from the controller 10.

Since both configurations and operations of the buffer circuit 4a and the booster circuit 4b are described in detail in publicly-known Japanese Patent Application Laid-Open No. 2011-193678, details thereof are omitted here. In short, the capacitor C4 is charged by the switching of the switch Sl from the DC bus LH via the reactor L4 and the diode D40. Further, the capacitor C4 is discharged to the DC buses LH and LL through conduction of the switch Sc.

That is, it can be understood that the capacitor C4 functions as the charge and discharge element, and the switch Sc controls the discharge from the charge and discharge element into the DC buses LH and LL. Further, it can be understood that current to be input into input terminals 31 and 32, and discharge current of the capacitor C4 as the charge and discharge element are commutated and output by the switching of the switch Sc.

The buffer circuit 4a is the buffer unit that is interposed between the single-phase diode rectifier 3 and the voltage-source inverter 5 as the diode bridge, and the buffer unit with the single-phase diode rectifier 3 together functions as the rectifying unit 2C for rectifying the single-phase voltage Vi as an alternating voltage so as to apply the link current Idc with the commutation caused by the switching of the switch Sc.

As to such rectifying unit 2C, it is also desirable that, similarly to the first embodiment, the link current Idc is zero at time of the switching operation of the switch Sc.

Figure 22:
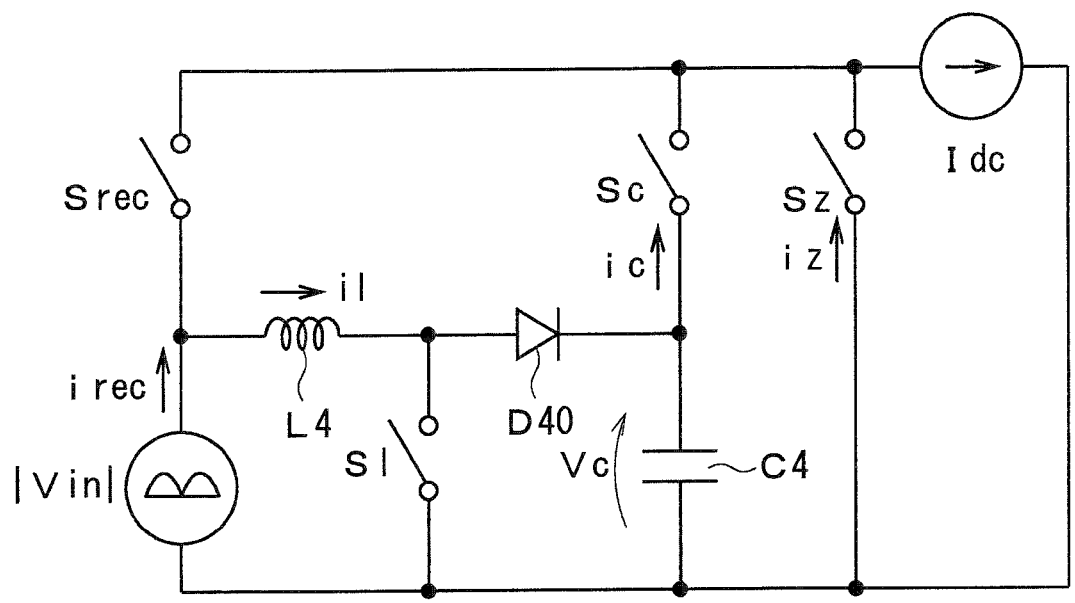
FIG. 22 is a circuit diagram illustrating an equivalent circuit of the single-phase/three-phase direct converting apparatus in FIG. 21.

FIG. 22 illustrates an equivalent circuit of a single-phase/three-phase direct converting apparatus (FIG. 2 in Japanese Patent Application Laid-Open No. 2011-193678) disclosed in Japanese Patent Application Laid-Open No. 2011-193678. With reference to FIG. 21 and FIG. 22, the link current Idc is assigned to a current Ic flowing in the capacitor C4, the current Irec flowing in the single-phase diode rectifier 3, and the current Iz flowing at a period when the voltage-source inverter 5 operates in the zero voltage vector.

In the equivalent circuit, the current Idc is treated as a current source, and the respective currents Ic, Irec, and Iz are treated as the currents that flow through the conduction of the switches Sc, Srec, and Sz. The switches Srec, Sc, and Sz are controlled so that any one of them is always conductive.

Since the switch Sl is not directly related to the commutation for outputting the link current Idc, when the description about the switch Sl in the equivalent circuit is omitted, the timing chart of that operation is similar to that in FIG. 20 describing Japanese Patent No. 5045716. However, in a period when the switch Sl is made to be conductive and the capacitor C4 is charged, a period when dc=0 is present, and in this case dz=1−drec, and the period tc' in FIG. 20 is eliminated.

Therefore, similarly to the rectifying unit 2B, in FIG. 4 to FIG. 7, FIG. 14 and FIG. 17 of this application, symbols drt and dst are replaced with symbols 1-dc and dc in the rectifying unit 2C.

Therefore, even when the current distribution factor dz is set to 0, the link current Idc can be set to 0 at the timing when the switch Sc is turned on/off, so that the modulation factor in the voltage-source inverter 5 can be improved while the zero-current switching is realized.

Concretely, in Japanese Patent Application Laid-Open No. 2011-193678, the carrier C1 that is obtained by shifting the carrier C employed for the switching in the voltage-source inverter 5 by the shift amount tc is employed as a carrier for obtaining a signal SSc.

Herein, since the buffer circuit 4a and the booster circuit 4b operate in a linkage manner, the carrier for obtaining the signal SSc is used also as a carrier for obtaining a signal SSl. Concretely, the value to be compared with the shifted carrier C1 does not have to be changed.

Since the generation of such a second carrier C1 is realized easily by delaying the carrier C using the phase device described in the first embodiment, details thereof are omitted. The controller 10 modified in such a manner can be regarded as not only the inverter controller 30 in the first embodiment but also the rectifying unit controller for allowing a rectifying unit 2C to perform the commutation. That is, the controller 10 functions as the power conversion control device of this application.

The circuit disclosed in Yoshiya Ohnuma, Jun-ichi Itoh, "Basic Investigation and Capacitance Reduction Method of a Novel Single-Phase to Three-Phase Power Converter", The papers of Technical Meeting on Semiconductor Power Converter, IEE Japan, SPC-08-162 (2008) has a configuration where the booster circuit 4b is eliminated from FIG. 21 of this application (see FIG. 11 in Japanese Patent Application Laid-Open No. 2011-193678). Also in such a configuration, the configuration of the rectifying unit 2C is maintained, and the switching of the booster circuit 4b is not directly related to the commutation of the link current Idc as described above. Also in this configuration, therefore, the carrier C1 obtained by shifting the carrier C to be employed for the switching of the voltage-source inverter 5 by the shift amount tc can be employed as the carrier for obtaining the signal SSc.

Modification

The shift amount tc, which is a shift of the timing when the current-source converter 2, the non-linear capacitor circuit 4, or the buffer circuit 4a performs the commutation with respect to the commutation reference time point t00 does not have to be always non-zero, and thus the carrier period in which tc=0 may be present.

The present invention is described in detail, but the above description is the example from all aspects, and thus the invention is not limited to it. It is understood that a lot of modified examples that are not illustrated here can be assumed without departing from the scope of the present invention.

The invention claimed is:

1. A power conversion control device for controlling a power converting apparatus,
said power converting apparatus including:
a plurality of input terminals for receiving alternating voltages,
first to third output terminals,
first and second DC buses,
a rectifying unit for rectifying said alternating voltages with commutation through switching, making said first DC bus have a higher potential than said second DC bus and applying a DC current from said first DC bus to said second DC bus, and
a voltage-source inverter for converting a DC voltage between said first DC bus and said second DC bus into three-phase voltages so as to output the three-phase voltages to said first to third output terminals,
said voltage-source inverter having:
three current paths connected to each other in parallel between said first and second DC buses between which said DC voltage is applied,
each of said three current paths has:
upper arm side switches connected between said first DC bus and said first to third output terminals, respectively, said upper arm side switches for applying currents from said first DC bus to said first to third output terminals, respectively, during conduction,
lower arm side switches connected between said first to third output terminals and said second DC bus, respectively, said lower arm side switches for applying currents from said first to third output terminals to said second DC bus, respectively, during conduction,
upper arm side diodes connected to said upper arm side switches, respectively, in anti-parallel, and
lower arm side diodes connected to the lower arm side switches, respectively, in anti-parallel,
said power conversion control device comprising:
a carrier generating unit for generating a carrier presenting a triangular wave in which an absolute value of a slope with respect to time is constant and which reciprocates between a minimum value and a maximum value;
a rectifying unit controller for making said rectifying unit perform the commutation at a time point obtained by adding predetermined time to a commutation reference time point when said carrier takes a commutation reference value no less than said minimum value and no more than said maximum value; and
an inverter controller for controlling an on/off of said upper arm side switches and said lower arm side switches of said voltage-source inverter based on a comparison between signal waves corresponding to said three-phase voltages and said carrier,
wherein
said inverter controller brings all of said upper arm side switches into an off state in an isolation period where a first time point is a commencement and a time point obtained by adding dead time to a second time point is a termination,
said first time point is a time point when said carrier takes a value of a first said signal wave, and said second time point is a time point when said carrier takes a value of a second said signal wave for the first time after said first time point,
said first said signal wave and said second said signal wave are said signal waves for a maximum phase of said three-phase voltages,
said upper arm side switches for applying a current corresponding to a voltage of said maximum phase shifts from an on state to an off state at said first time point, and shifts from the off state to the on state after said dead time passes since said second time point,
said predetermined time is set to a value that is larger than a value obtained by subtracting said commutation reference time point from said first time point and is shorter than a sum of a value obtained by subtracting said commutation reference time point from said second time point and said dead time.

2. The power conversion control device according to claim 1, wherein said plurality of input terminals are three input terminals,
said rectifying unit is a current-source converter, has a switch group including three switch devices connected between said first to third input terminals and said first DC bus, respectively, and three switch devices connected between said first to third input terminals and said second DC bus, respectively, and commutates and outputs three-phase currents to be input into said first to third input terminals by switching of said switch group.

3. The power conversion control device according to claim 1, wherein said plurality of input terminals are a pair of input terminals,
said rectifying unit has
a diode bridge connected to said pair of input terminals, and
a buffer unit including charge and discharge element and switch devices, for controlling discharge from said charge and discharge element to said first and second DC buses,
said rectifying unit commutates and outputs current to be input into said pair of input terminals and discharge current of said charge and discharge element by switching of said switch group.

4. The power conversion control device according to claim 1, wherein said predetermined time is set to a half of a sum of a value obtained by subtracting said commutation reference time point from said first time point, a value obtained by subtracting said commutation reference time point from said second time point, and said dead time.

5. The power conversion control device according to claim 1, wherein a value obtained by subtracting said first said signal wave from said second said signal wave is larger than a value obtained by subtracting a product of an absolute value of said slope of said carrier and said dead time from zero.

6. The power conversion control device according to claim 1, wherein said predetermined time is set to a half of said dead time.

7. The power conversion control device according to claim 2, wherein said predetermined time is set to a half of a sum of a value obtained by subtracting said commutation reference time point from said first time point, a value obtained by subtracting said commutation reference time point from said second time point, and said dead time.

8. The power conversion control device according to claim 3, wherein said predetermined time is set to a half of a sum of a value obtained by subtracting said commutation reference time point from said first time point, a value obtained by subtracting said commutation reference time point from said second time point, and said dead time.

9. The power conversion control device according to claim 2, wherein a value obtained by subtracting said first said signal wave from said second said signal wave is larger than a value obtained by subtracting a product of an absolute value of said slope of said carrier and said dead time from zero.

10. The power conversion control device according to claim 3, wherein a value obtained by subtracting said first said signal wave from said second said signal wave is larger than a value obtained by subtracting a product of an absolute value of said slope of said carrier and said dead time from zero.

11. The power conversion control device according to claim 4, wherein a value obtained by subtracting said first said signal wave from said second said signal wave is larger than a value obtained by subtracting a product of an absolute value of said slope of said carrier and said dead time from zero.

12. The power conversion control device according to claim 7, wherein a value obtained by subtracting said first said signal wave from said second said signal wave is larger than a value obtained by subtracting a product of an absolute value of said slope of said carrier and said dead time from zero.

13. The power conversion control device according to claim 8, wherein a value obtained by subtracting said first said signal wave from said second said signal wave is larger than a value obtained by subtracting a product of an absolute value of said slope of said carrier and said dead time from zero.

14. The power conversion control device according to claim 2, wherein said predetermined time is set to a half of said dead time.

15. The power conversion control device according to claim 3, wherein said predetermined time is set to a half of said dead time.

* * * * *